(12) United States Patent
Liu et al.

(10) Patent No.: US 12,495,431 B2
(45) Date of Patent: Dec. 9, 2025

(54) RESOURCE SET CONFIGURATION METHOD, DETECTION METHOD, SERVICE NODE, TERMINAL, AND STORAGE MEDIUM

(71) Applicant: ZTE CORPORATION, Guangdong (CN)

(72) Inventors: Kun Liu, Guangdong (CN); Bo Dai, Guangdong (CN); Huiying Fang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 409 days.

(21) Appl. No.: 18/019,896

(22) PCT Filed: Jul. 7, 2021

(86) PCT No.: PCT/CN2021/104945
§ 371 (c)(1),
(2) Date: Feb. 6, 2023

(87) PCT Pub. No.: WO2022/028192
PCT Pub. Date: Feb. 10, 2022

(65) Prior Publication Data
US 2023/0292336 A1   Sep. 14, 2023

(30) Foreign Application Priority Data
Aug. 6, 2020  (CN) .......................... 202010785229.6

(51) Int. Cl.
*H04W 72/232* (2023.01)
*H04W 56/00* (2009.01)
*H04W 72/1273* (2023.01)

(52) U.S. Cl.
CPC ..... *H04W 72/232* (2023.01); *H04W 56/0015* (2013.01); *H04W 72/1273* (2013.01)

(58) Field of Classification Search
CPC .......... H04W 72/232; H04W 56/0015; H04W 72/1273; H04W 72/23; H04L 5/0053; H04L 1/08; H04L 5/003
See application file for complete search history.

(56) References Cited

U.S. PATENT DOCUMENTS

2019/0150121 A1   5/2019   Abdoli
2019/0158205 A1   5/2019   Sheng et al.
(Continued)

FOREIGN PATENT DOCUMENTS

CN   110602731 A   12/2019
CN   111345072 A   6/2020
(Continued)

OTHER PUBLICATIONS

China National Intellectual Property Administration Search Report issued in CN Application No. 202010785229.6, dated Jul. 11, 2024, 6 pages.
(Continued)

*Primary Examiner* — Jung H Park
(74) *Attorney, Agent, or Firm* — KDW FIRM PLLC

(57) ABSTRACT

Provided are a resource set configuration method, a detection method, a service node, a terminal and a storage medium. The resource set configuration method includes: configuring at least one control resource set (CORESET) corresponding to a target type terminal within one period or one time duration; and sending a physical downlink control channel (PDCCH) in the at least one CORESET.

18 Claims, 4 Drawing Sheets

(56) References Cited

U.S. PATENT DOCUMENTS

| | | | |
|---|---|---|---|
| 2020/0260412 A1* | 8/2020 | Liu | H04L 5/0048 |
| 2022/0095118 A1* | 3/2022 | Harada | H04L 5/0044 |
| 2022/0407655 A1 | 12/2022 | Liu | |
| 2023/0189124 A1* | 6/2023 | Kusashima | H04L 5/0053 370/312 |

FOREIGN PATENT DOCUMENTS

| | | | |
|---|---|---|---|
| CN | 111901085 A | 11/2020 | |
| CN | 111934834 A | 11/2020 | |
| WO | 2019050306 A1 | 3/2019 | |
| WO | 2019223580 A1 | 11/2019 | |
| WO | 2020149978 A1 | 7/2020 | |

OTHER PUBLICATIONS

China National Intellectual Property Administration Notice of the First Review Opinion issued in CN Application No. 202010785229.6, dated Jul. 11, 2024, 10 pages.

Supplementary European Search Report issued in EP Application No. 21853324, dated Aug. 31, 2024, 2 pages.

International Search Report mailed Sep. 29, 2021, for Application No. PCT/CN2021/104945 (four (4) pages).

Enovo et al., "On UE complexity reduction features", 3GPP TSG RAN WG1 Meeting #101 R1-2003828 E-meeting, May 25-Jun. 5, 2020.

Indian Office Action for Application No. 202327014770 dated Sep. 5, 2023.

\* cited by examiner

RESOURCE SET CONFIGURATION METHOD, DETECTION METHOD, SERVICE NODE, TERMINAL, AND STORAGE MEDIUM

CROSS-REFERENCE TO RELATED APPLICATIONS

This is a National Stage Application filed under 35 U.S.C. 371 based on International Patent Application No. PCT/CN2021/104945, filed on Jul. 7, 2021, which claims priority to Chinese Patent Application No. 202010785229.6 filed on Aug. 6, 2020, the disclosures of both of which are incorporated herein by reference in their entireties.

TECHNICAL FIELD

The present application relates to a wireless communication network, for example, a resource set configuration method, a detection method, a service node, a terminal and a storage medium.

BACKGROUND

A new radio (NR) system has relatively high configuration flexibility and a larger bandwidth range, and a higher requirement is also imposed on a user equipment (UE) capability. However, among various scenarios supported by the NR system, not all the scenarios require such a high UE capability. For example, for scenarios such as a smart wearable device, video surveillance and an industrial wireless sensor, the UE capability may be reduced. For example, the UE has a relatively low bandwidth capability and a relatively small number of antennas so that a production cost and complexity of the UE are reduced and energy consumption in a working process of the UE is also reduced. Since a control resource set (CORESET) has a fixed configuration mode and the reception performance of this type of reduced capability user equipment (RedCap UE) is lower than that of non-RedCap UE in the NR system, based on the same configuration as the non-RedCap UE, it cannot be ensured that the RedCap UE correctly detects control information of a downlink channel by decoding the CORESET, thereby affecting an initial access procedure.

SUMMARY

The following is a summary of the subject matter described herein in detail. The summary is not intended to limit the scope of the claims.

The present application provides a resource set configuration method, a detection method, a service node, a terminal and a storage medium so that the flexibility and reliability of a configuration of a CORESET are improved.

Embodiments of the present application provide a resource set configuration method. The resource set configuration method includes the following.

At least one of CORESET corresponding to a target type terminal is configured within one period or one time duration.

A physical downlink control channel (PDCCH) is sent in the CORESET.

Embodiments of the present application further provide a detection method. The detection method includes the following.

At least one CORESET corresponding to a target type terminal is learned within one period or one time duration.

A PDCCH is detected in the at least one CORESET.

Embodiments of the present application further provide a service node. The service node includes one or more processors and a storage apparatus which is configured to store one or more programs.

The one or more programs, when executed by the one or more processors, cause the one or more processors to implement the above resource set configuration method.

Embodiments of the present application further provide a terminal. The terminal includes one or more processors and a storage apparatus which is configured to store one or more programs.

The one or more programs, when executed by the one or more processors, cause the one or more processors to implement the above detection method.

Embodiments of the present application further provide a computer-readable storage medium storing a computer program, where the program, when executed by a processor, implements the above resource set configuration method or detection method.

Other aspects can be understood after the drawings and the detailed description are read and understood.

DETAILED DESCRIPTION

Figure 1:
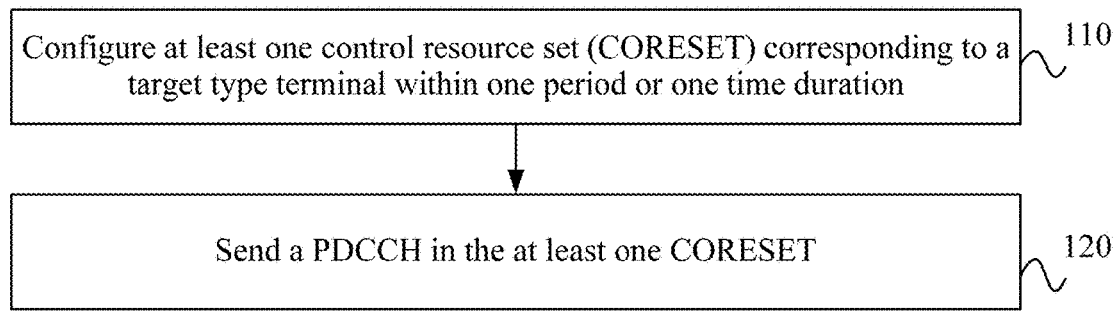
FIG. 1 is a flowchart of a resource set configuration method according to an embodiment.

The present application is described hereinafter in conjunction with drawings and embodiments. It is to be understood that the embodiments described herein are intended to explain the present application and not to limit the present application. It is to be noted that if not in collision, the embodiments described herein and the features thereof may be combined with each other. Additionally, it is to be noted that for ease of description, only part, not all, of structures related to the present application are illustrated in the drawings.

In an initial access procedure of an NR system, a terminal first receives a synchronization signal block (SSB)/physical broadcast channel (PBCH) block. The SSB includes a primary synchronization signal (PSS), a secondary synchronization signal (SSS) and a physical broadcast channel (PBCH), where a master information block (MIB) carried in the PBCH includes configuration information of a control resource set 0 (CORESET 0). The CORESET 0 includes at least one resource sent by a PDCCH, and the PDCCH is used for carrying scheduling information of a system information block 1 (SIB 1). After receiving the SSB, the terminal acquires the configuration information of the CORESET 0 by decoding the MIB, learns the scheduling information of the SIB 1 by decoding the PDCCH in the CORESET 0 and finally decodes corresponding information of the SIB 1 so that a physical downlink shared channel (PDSCH) is determined. Since the reception performance of RedCap UE is lower than that of NR UE, the PDCCH may not be correctly detected in a process where the RedCap UE decodes the PDCCH in the CORESET 0, resulting in that the RedCap UE cannot complete the initial access procedure. The method according to the embodiments of the present application is applicable to a scenario where a PDCCH in a CORESET is detected.

A protocol specifies that the CORESET and the SSB have three types of multiplexing patterns. For a pattern 1, a period of the CORESET 0 is 20 ms by default and is not varied due to a variation in a period of the SSB. Resources of CORESETs 0 corresponding to different SSBs may use frequency-division multiplexing (FDM) in a frequency domain, and physical resource blocks (PRBs) occupied in the frequency domain by a CORESET 0 corresponding to each SSB may be configured by a service node. In some scenarios, a CORESET 0 corresponding to each SSB occupies two slots and does not share the same slot with a CORESET 0 corresponding to another SSB.

In the embodiments of the present application, a resource set configuration method is provided. A corresponding CORESET is configured for a target type terminal so that the flexibility and reliability of the configuration of the CORESET are improved and the target type terminal can effectively detect the corresponding CORESET and accurately obtain control information of a downlink channel, thereby completing an initial access procedure.

FIG. 1 is a flowchart of a resource set configuration method according to an embodiment. The method may be applied to a service node. As shown in FIG. 1, the method according to the present embodiment includes operations 110 and 120.

In operation 110, at least one CORESET corresponding to a target type terminal is configured within one period or one time duration.

In operation 120, a PDCCH is sent in the at least one CORESET.

In the present embodiment, the target type terminal refers to RedCap UE. The target type terminal has a reduced capability, and the reception performance of the target type terminal is lower than that of a non-target type terminal (which may be understood as NR UE or legacy UE) in an NR system. Based on the same configuration as the non-target type terminal, it cannot be ensured that the target type terminal can correctly learn the CORESET and acquire control information of a downlink channel. In the present embodiment, a service node considers the capability of the target type terminal, configures the corresponding CORESET for the target type terminal and sends the PDCCH through the configured CORESET. The target type terminal can obtain an accurate PDCCH by detecting and decoding the corresponding CORESET. The CORESET corresponding to the target type terminal may be separately configured for the target type terminal, or may be shared with the non-target type terminal.

In an embodiment, the CORESET includes at least one of a first CORESET corresponding to at least one first SSB within the period or the time duration or at least one second CORESET.

In the present embodiment, the CORESET of the target type terminal may include a first CORESET corresponding to at least one first SSB within a period or a time duration, where the first SSB refers to an SSB corresponding to the non-target type terminal in the NR system. On the one hand, the first SSB may be used for indicating a corresponding first CORESET for the non-target type terminal, where the first CORESET includes a PDCCH corresponding to the non-target type terminal. On the other hand, the first CORESET indicated by the at least one first SSB within the period or the time duration may also be used by the target type terminal, that is, the first CORESET may be determined by the target type terminal as the CORESET corresponding to the target type terminal.

Within one period or one time duration, the number of first SSBs is at least 1. For example, the number of first SSBs is 4, and indexes I of the first SSBs are 0, 1, 2 and 3, respectively. First CORESETs corresponding to all or part of the first SSBs (for example, the first SSB whose index is 0 and the first SSB whose index is 1) may be configured as the CORESET corresponding to the target type terminal, and the target type terminal can accurately detect the PDCCH by detecting this type of corresponding CORESET.

In the present embodiment, the CORESET corresponding to the target type terminal may further include at least one second CORESET. The second CORESET refers to the CORESET separately configured for the target type terminal and cannot be identified by the non-target type terminal. The second CORESET is a resource except the first SSB and the first CORESET within the period or the time duration.

In an embodiment, operation 101 is further included.

In operation 101, an additional SSB corresponding to the target type terminal is configured within the period or the time duration, where the additional SSB and the second CORESET have an association relationship.

In the present embodiment, the additional SSB is separately configured for the target type terminal. The additional SSB is used for indicating a corresponding second CORESET for the target type terminal and cannot be identified by the non-target type terminal.

In the case where the additional SSB is separately configured for the target type terminal, the CORESET corresponding to the target type terminal may be determined according to the first CORESET corresponding to at least one first SSB within the period or the time duration, or may be determined according to the second CORESET corresponding to the additional SSB, or may be jointly determined according to the first CORESET corresponding to at least one first SSB within the period or the time duration and the second CORESET corresponding to the separately configured additional SSB, and the PDCCH may be transmitted according to the CORESET corresponding to the target type terminal.

Figure 2:
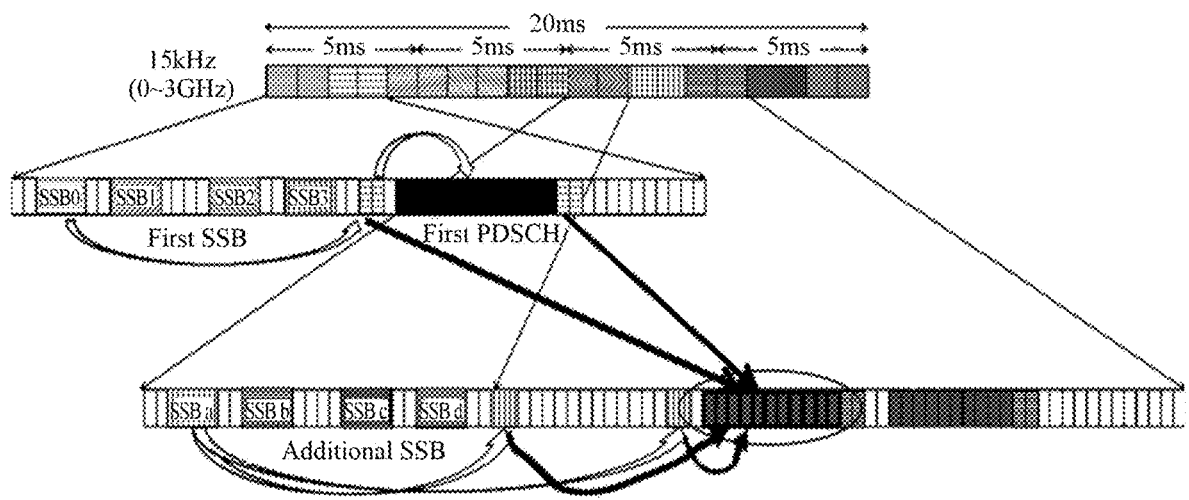
FIG. 2 is a schematic diagram illustrating that a CORESET corresponding to a target type terminal is determined in the case where an additional synchronization signal block (SSB) is configured according to an embodiment.

FIG. 2 is a schematic diagram illustrating that a CORESET corresponding to a target type terminal is determined in the case where an additional SSB is configured according to an embodiment. An actual transmission period of the first SSB may be 5 ms, 10 ms, 20 ms, 40 ms, 80 ms or 160 ms, but the terminal does not determine the transmission period of the first SSB in an initial access procedure. For the pattern 1, as shown in FIG. 2, a default period of the first SSB is 20 ms, where the first SSB includes SSBs 0 to 3. The first CORESET (marked with the same horizontal line as the SSB 0) may be determined according to the SSB 0, and a first PDSCH (the black filled region) may be determined according to the first CORESET. The additional SSB includes SSBs a to d, and a period of the additional SSB may be relatively small, for example, 10 ms, and thus there are two additional SSBs used by the target type terminal within 20 ms, where one of the two additional SSBs has the same resource as the first SSB, and the other additional SSB is specially configured for the target type terminal. The non-target type terminal can accurately determine a position of the first CORESET by detecting the first SSB (the SSB 0) or the second CORESET and learn remaining minimum system information (RMSI) (a resource of an SIB 1) corresponding to the non-target type terminal by decoding the first CORESET. The target type terminal can learn a position of the CORESET corresponding to the target type terminal by detecting the first SSB or the additional SSB and obtain a second PDSCH (the bold region in the ellipse) by decoding the CORESET. The second PDSCH may also be obtained by combining the detected first CORESET and the detected second CORESET (As shown by the four black bold arrows).

In an embodiment, the period of the additional SSB is shorter than the period of the first SSB. In this manner, it is ensured that the target type terminal can definitely detect at least one additional SSB within a period of each first SSB so that the second CORESET is determined according to the at least one additional SSB and the PDCCH is accurately detected.

In an embodiment, the number of additional SSBs is less than or equal to the number of first SSBs.

In the present embodiment, the number of additional SSBs may be equal to the number of first SSBs, that is, for all SSBs, corresponding additional SSBs are configured for the target type terminal; the number of additional SSBs may also be less than the number of first SSBs, for example, in the case where a time domain resource is insufficient, for part of the SSBs, corresponding additional SSBs may be configured for the target type terminal.

In an embodiment, in the case where the number of additional SSBs is less than the number of first SSBs, indexes of the additional SSBs are 0 to (N2−1), where N2 is the number of additional SSBs.

For example, the number of first SSBs is N1, the number of additional SSBs is N2, and N2<N1. In this case, the indexes of the additional SSBs are 0 to (N2−1).

In an embodiment, a time domain position of the second CORESET is that a set offset value is added based on a time domain position of the first CORESET.

The present embodiment is for the pattern 1, that is, a scenario where a period of the first CORESET is 20 ms by default. The time domain position of the second CORESET is that the set offset value is added to the time domain position of the first CORESET, where the set offset value is 5 ms or 10 ms.

It is to be noted that if the set offset value is relatively small, which results in a collision between a first CORESET corresponding to a first SSB within a previous period and a first CORESET corresponding to a first SSB within a current period, the target type terminal is required to select one first CORESET from the first CORESETs as a basis for determining the corresponding CORESET. Otherwise, the target type terminal has degraded detection performance in a process of combination detection due to the conflicting first CORESETs of the first SSBs, and the PDCCH cannot be accurately obtained. In some embodiments, the service node should configure the set offset value to be greater than a certain value, thereby avoiding a collision between first CORESETs within different periods.

In an embodiment, for the target type terminal, the number of repetitions of a PDSCH is indicated by first downlink control information (DCI); alternatively, the number of repetitions of the PDSCH is indicated by second DCI; alternatively, the number of repetitions of the PDSCH is the same as the number of first CORESETs configured within the period or the time duration; alternatively, the number of repetitions of the PDSCH is the same as the number of second CORESETs configured within the period or the time duration; alternatively, the number of repetitions of the PDSCH is the same as a sum of the number of first CORESETs configured within the period or the time duration and the number of second CORESETs configured within the period or the time duration; alternatively, in the case where the corresponding additional SSB is configured for the target type terminal, the number of repetitions of the PDSCH is the same as the number of repetitions of the additional SSB within the period or the time duration; alternatively, in the case where the corresponding additional SSB is configured for the target type terminal, the number of repetitions of the PDSCH is the same as a sum of the number of repetitions of the first SSB within the period or the time duration and the number of repetitions of the additional SSB within the period or the time duration.

In the present embodiment, the first DCI is configured for the non-target type terminal, and a reserved bit in the first DCI may be used for indicating the number of repetitions of the PDSCH of the target type terminal. The second DCI is configured for the target type terminal and may be used for indicating the number of repetitions of the PDSCH of the target type terminal, and the non-target type terminal cannot interpret the second DCI. The number of repetitions of the PDSCH of the target type terminal may be the same as the number of first CORESETs configured within a period or a time duration, may be the same as a sum of the number of first CORESETs configured within the period or the time duration and the number of second CORESETs configured within the period or the time duration, or may be the same as the number of second CORESETs configured within the period or the time duration. If an additional SSB is separately configured for the target type terminal, the number of repetitions of the PDSCH of the target type terminal may also be the same as the number of repetitions of the additional SSB within the period or the time duration, where the number of repetitions of the additional SSB refers to the number of repetitions of additional SSBs having the same index. Alternatively, the number of repetitions of the PDSCH of the target type terminal is the same as a sum of the number of repetitions of the first SSB within the period or the time duration and the number of repetitions of the additional SSB within the period or the time duration, where the number of repetitions of the first SSB refers to the number of repetitions of first SSBs having the same index, and the number of repetitions of the additional SSB refers to the number of repetitions of additional SSBs having the same index.

In an embodiment, the first DCI scheduling the non-target type terminal and the second DCI scheduling the target type terminal carry the same information.

In the present embodiment, the first DCI carried in the PDCCH of the first CORESET and the second DCI carried in the PDCCH of the second CORESET carry the same information. In this case, the target type terminal can perform the combination detection on the PDCCH of the first CORESET and the PDCCH of the second CORESET to obtain a corresponding PDSCH.

In an embodiment, the number of repetitions used by the CORESET corresponding to the target type terminal (the number of combination detections) may be a default value, for example, the number of CORESETs within 20 ms.

In an embodiment, in the case where the first CORESET and the second CORESET are subjected to the combination detection, a start slot of the PDSCH of the target type terminal is the same as a last slot where the CORESET is located.

In an embodiment, in the case where the corresponding additional SSB is configured for the target type terminal, first MIB information in the first SSB is consistent with second MIB information in the additional SSB.

In the present embodiment, resource configuration information of the first CORESET remains to be consistent with that of the second CORESET, that is, the information carried in the first MIB is consistent with that carried in the second MIB. In this manner, in the case where the non-target type terminal directly interprets the additional SSB as the first SSB, after the additional SSB is decoded, the position of the first CORESET can be accurately determined.

Figure 3:
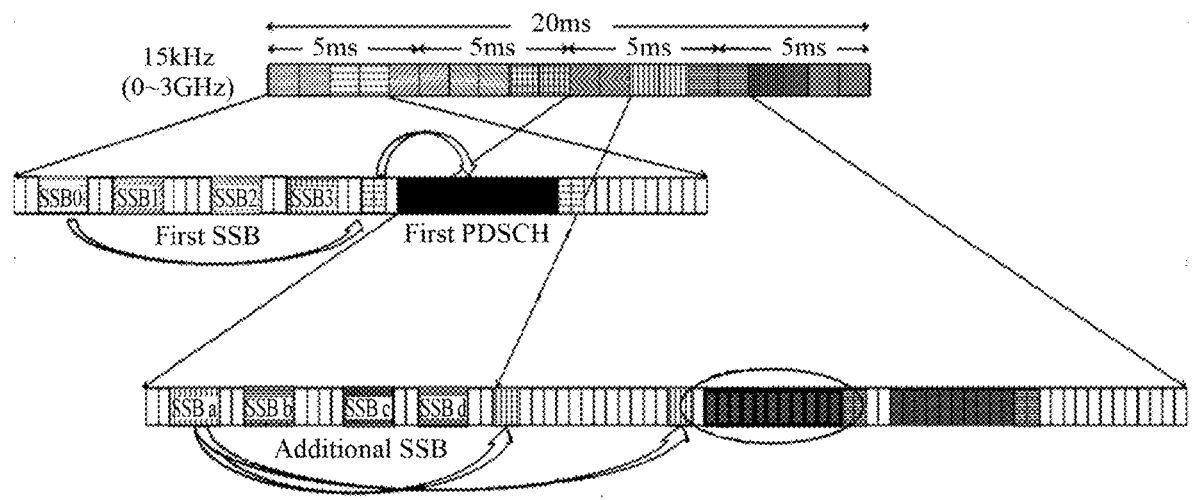
FIG. 3 is a schematic diagram illustrating that a CORESET corresponding to a target type terminal is determined in the case where an additional SSB is configured according to another embodiment.

FIG. 3 is a schematic diagram illustrating that a CORESET corresponding to a target type terminal is determined in the case where an additional SSB is configured according to another embodiment. As shown in FIG. 3, the non-target type terminal can only determine the position of the first CORESET by detecting the first SSB (the SSB 0) and learn the resource of the RMSI (the SIB 1) corresponding to the non-target type terminal by decoding the first CORESET. The target type terminal can only learn the position of the CORESET corresponding to the target type terminal by detecting the first SSB or the additional SSB and obtain the second PDSCH (the bold region in the ellipse) by decoding the corresponding CORESET.

In an embodiment, in the case where the corresponding additional SSB is configured for the target type terminal, the first SSB and the additional SSB satisfy at least one of the following: a sequence used by a synchronization signal in the first SSB is different from a sequence used by a synchronization signal in the additional SSB; a relative position between a PSS and an SSS in the first SSB is different from a relative position between a PSS and an SSS in the additional SSB; or a scrambling operation is performed on a PBCH in the additional SSB using a dedicated scrambling code of the target type terminal.

In the present embodiment, the non-target type terminal detects the PDCCH in the first CORESET according to the first SSB and determines first RMSI corresponding to the non-target type terminal. According to whether the detected SSB is the first SSB or the additional SSB, the target type terminal accordingly determines whether to continue detecting the first CORESET or the second CORESET. To avoid a false detection of the SSBs by the non-target type terminal (the additional SSB is interpreted as the first SSB), the first SSB may be distinguished from the additional SSB in the following manners: (1) the sequence used by the synchronization signal in the first SSB is different from the sequence used by the synchronization signal in the additional SSB; (2) the relative position between the PSS and the SSS in the first SSB is different from the relative position between the PSS and the SSS in the additional SSB; and (3) the scrambling operation is performed on the PBCH in the additional SSB using the dedicated scrambling code of the target type terminal. Therefore, the flexibility of the configuration of the CORESET and the reliability of the detections of different types of terminal are improved.

In an embodiment, for the target type terminal, an index of a start slot of the PDSCH is an index of a last slot among slots where the second CORESET is located plus N, where N is an integer greater than or equal to 0, and a value of N is configured by a service node or is a default value.

In the present embodiment, the last slot where the second CORESET is located refers to: after the target type terminal successfully decodes an SSB of one index (the SSB may be the first SSB or the additional SSB), a position of a last slot in at least one CORESET corresponding to the SSB of the one index.

Figure 4:
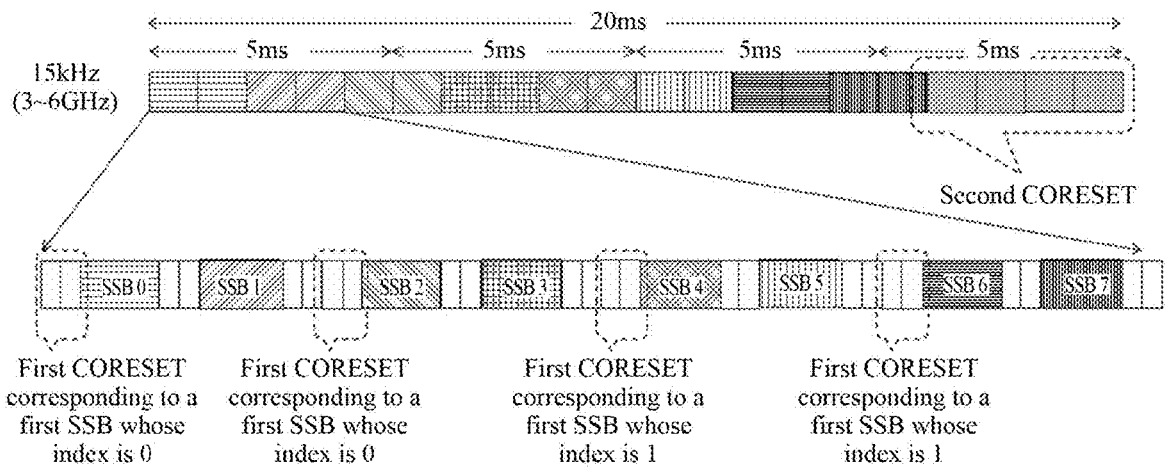
FIG. 4 is a schematic diagram illustrating that a second CORESET is configured according to an embodiment.

In an embodiment, the second CORESET is configured by the first SSB, and a start slot of the second CORESET is determined according to a predetermined rule or indicated by the first SSB. FIG. 4 is a schematic diagram illustrating that a second CORESET is configured according to an embodiment. As shown in FIG. 4, a first SSB includes SSBs 0 to 7, and no additional SSB is separately configured for a target type terminal. A start slot of the second CORESET is determined according to a predetermined rule or indicated by the first SSB. For example, a first CORESET corresponds to two slots, and the second CORESET is configured in a slot before or after the two slots, which is equivalent to increasing the number of repetitions of a CORESET corresponding to the target type terminal.

In an embodiment, slots where the second CORESET is located include slots within the period or the time duration and do not include at least one of: a slot occupied by the first SSB; a slot occupied by the first SSB, where the first CORESET exists in the slot; or slots where the first CORESET is located.

In the present embodiment, the slots where the second CORESET is located are determined according to the following principle: within one period or one time duration, the slots where the second CORESET is located cannot be the slot occupied by the first SSB, or cannot be the slot occupied by the first SSB, where the first CORESET exists in the slot, or cannot be the slots where the first CORESET is located, or cannot be multiple types of slot among the above three types of slot.

In an embodiment, the slots where the second CORESET is located cannot be the slot occupied by the first SSB, where the first CORESET exists in the slot, and cannot be the slots where the first CORESET is located, thereby distinguishing the first CORESET from the second CORESET.

In an embodiment, the slots where the second CORESET is located include the slots within a period or a time duration, and an index of a start slot is an index of a last slot among the slots where the first CORESET is located plus G1, where G1 is greater than or equal to 0.

In the present embodiment, the slots where the second CORESET is located are determined according to the following principle: within one period or one time duration, the start slot among the slots where the second CORESET is located is the last slot among the slots where the first CORESET is located+G1 slots, where the slots where the first CORESET is located refer to slots where all first CORESETs corresponding to all first SSBs are located.

In an embodiment, slots whose indexes are Offset+I*K(I) to Offset+(I+1)*K(I)−1 among a set of the slots where the second CORESET is located are slots where a second CORESET corresponding to a first SSB with an index of I is located. In the set of the slots where the second CORESET is located, a slot index is numbered from 0, and K(I) is the number of slots occupied by the second CORESET corresponding to the first SSB with an index of I. Offset is an offset amount, where a value of the offset amount is configured by a service node or is a default value.

For example, in the set of the slots where the second CORESET is located, slots where a second CORESET corresponding to a first SSB (the SSB 0) whose index is 0 is located are slots Offset to Offset+K(1)1, and slots where a second CORESET corresponding to a first SSB (the SSB 1) whose index is 1 is located are slots Offset+K(1) to Offset+2*K(2)−1.

In an embodiment, operation 102 is further included.

In operation 102, the slots where the second CORESET corresponding to the first SSB with an index of I is located are configured, and in the case where indexes of the configured slots exceed a slot index range of the set of the slots where the second CORESET is located, no second CORESET is configured for the first SSB with an index of I.

In the present embodiment, if the slot indexes of the slots where the second CORESET corresponding to the first SSB with an index of I is located do not belong to a slot range where the second CORESET is located, no second CORESET is configured for the first SSB with an index of I, that is, the target type terminal cannot determine the second CORESET according to the first SSB with an index of I, but can only determine the second CORESET according to a first SSB whose corresponding slot indexes belong to the slot range.

In an embodiment, the number of slots occupied by the second CORESET corresponding to the first SSB with an index of I among second CORESETs is the same as the number of slots occupied by a first CORESET corresponding to the first SSB with the same index.

For example, the number of slots occupied by the second CORESET corresponding to the first SSB whose index is 0 (the SSB 0) among the second CORESETs is the same as the number of slots occupied by a first CORESET corresponding to the SSB 0.

In an embodiment, operation 103 is further included. In operation 103, the first SSB indicates at least one of the following: whether the first SSB configures the second CORESET is indicated; the number of slots occupied by the second CORESET corresponding to the first SSB is indicated; or positions of the slots occupied by the second CORESET corresponding to the first SSB are indicated.

In an embodiment, in the case where a gap between a frequency-domain resource position of the first SSB and a frequency domain position of the first CORESET is greater than a set value, a frequency domain position of the second CORESET is located between the frequency-domain resource position of the first SSB and the frequency domain position of the first CORESET.

In the present embodiment, if the gap between the frequency domain position of the first SSB and the frequency domain position of the first CORESET is great enough, the second CORESET may be configured between the frequency domain position of the first SSB and the frequency domain position of the first CORESET, reducing an interference between the separately configured second CORESET and the first SSB or the first CORESET.

In an embodiment, the set value is determined by at least one of the following: being configured by a service node; being set as a default value; or being determined according to a subcarrier spacing of the second CORESET.

For example, each of the subcarrier spacing corresponds to one or more gap values. In the case where each of the subcarrier spacing corresponds to one gap value, the gap may be directly determined by the subcarrier spacing. In the case where each of the subcarrier spacing corresponds to multiple gap values, an optional set of the gap may be determined by the subcarrier spacing, and a specific value of the gap in the optional set is indicated by specific signaling.

In an embodiment, the subcarrier spacing of the second CORESET is the same as subcarrier spacing of the first CORESET.

In an embodiment, the frequency domain position of the second CORESET is adjacent to the frequency domain position of the first CORESET.

In the present embodiment, "adjacent" means that the frequency domain position of the second CORESET and the frequency domain position of the first CORESET are connected end to end, or that the second CORESET and the first CORESET each have a guard bandwidth on a frequency-domain resource and the frequency-domain resource occupied by the guard bandwidth of the second CORESET and the frequency-domain resource occupied by the guard bandwidth of the first CORESET are connected end to end.

In an embodiment, a size of the frequency-domain resource occupied by the second CORESET is a maximum value of a frequency-domain resource configurable for the second CORESET, where the maximum value satisfies a value less than or equal to the gap.

In the present embodiment, the frequency-domain resource occupied by the second CORESET is less than or equal to the gap between the frequency-domain resource position of the first SSB and the frequency domain position of the first CORESET, and the value of the frequency-domain resource occupied by the second CORESET is configured to be as great as possible so that the target type terminal detects the second CORESET more effectively.

In an embodiment, the start slot (the index of the start slot) of the second CORESET may be indicated by the first SSB, or may be determined according to a default rule, for example, the start slot is a first slot after a resource of the first CORESET ends.

Slots where a second CORESET corresponding to each first SSB is located may be indicated by the each first SSB, or may be jointly indicated together with an index of a start slot. Each first SSB may correspond to a default number of second CORESETs.

It is to be noted that not each first SSB has a corresponding second CORESET. For example, for a first SSB of one index, in the case where a distance between slots where a second CORESET corresponding to the first SSB is located and a first CORESET corresponding to the first SSB exceeds a threshold (the distance is relatively long), the first SSB of the one index does not correspond to a second CORESET. For another example, a second CORESET within a time window starting from the first SSB and being within 20 ms is valid, and no second CORESET is configured for a range beyond the time window.

In an embodiment, symbols corresponding to the second CORESET are located in slots where the first CORESET is located.

For example, some symbols are configured in two slots where the first CORESET is located for sending the second CORESET.

Figure 5:
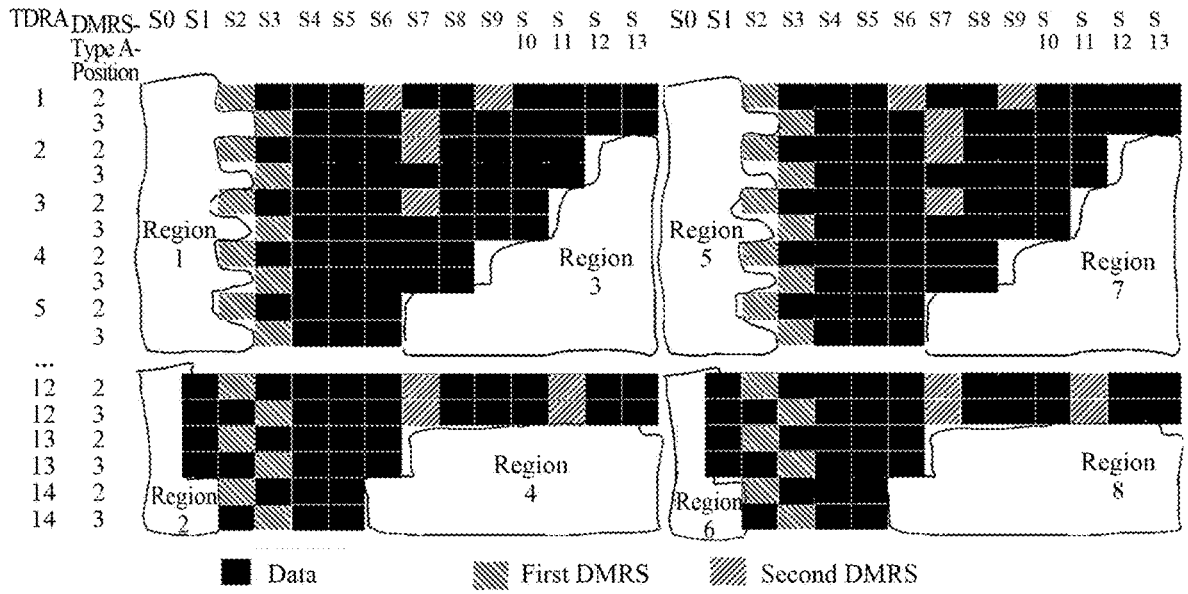
FIG. 5 is a schematic diagram illustrating that symbols of a second CORESET are configured according to an embodiment.

FIG. 5 is a schematic diagram illustrating that symbols of a second CORESET are configured according to an embodiment. As shown in FIG. 5, in the present embodiment, the second CORESET may be configured in a region other than symbols occupied by a first CORESET. A symbol distribution of two slots is shown in FIG. 5. A time domain resource assignment (TDRA) index is used for indicating a resource assignment scheme of a PDSCH, and the resource assignment scheme may be indicated by DCI in a PDCCH of the CORESET. A demodulation reference signal-type A-position (DMRS-Type A-Position) refers to a symbol position where a front DMRS in a type A-PDSCH is located, and the symbol position may be indicated by an MIB in an SSB. S0, S1, . . . are indexes of the symbols. A resource assignment scheme of the type A-PDSCH may be determined in conjunction with the TDRA index and the DMRS-Type A-Position.

In the present embodiment, configuration information of the first CORESET exists in a first SSB and occupies eight bits. The configuration information of the first CORESET may be expressed as PDCCH-configSIB1. A region of the second CORESET may be mapped for a target type terminal within two slots by reusing the eight bits of PDCCH-configSIB1. No overlap exists between a time domain region corresponding to the first CORESET and a time domain region corresponding to the second CORESET, and no overlap exists between a time domain region of a PDSCH associated with the first CORESET and the time domain region corresponding to the second CORESET, which may be implemented by scheduling of a service node.

In the present embodiment, a reserved bit in a second MIB is used for separately configuring the second CORESET for the target type terminal. For example, the number of symbols occupied by the second CORESET by default and the number of PRBs occupied by the second CORESET by default are configured to be consistent with those occupied by the first CORESET, and in the second MIB, only a start symbol of the second CORESET is indicated.

In an embodiment, the symbols corresponding to the second CORESET are indicated by configuration information of the second CORESET in the first SSB.

The configuration information of the second CORESET in the first SSB is further used for indicating at least one of the following: whether to configure the second CORESET is indicated; start symbol index information of at least one second CORESET is indicated; or in the case where the number of slots where the first CORESET is located is greater than 1, the slots where the second CORESET is located are indicated.

In the present embodiment, the symbols corresponding to the second CORESET are indicated by the configuration information of the second CORESET (PDCCH-configSIB2) in the first SSB. The configuration information of the second CORESET may further be used for indicating whether to configure the second CORESET for the target type terminal, indicating an index of a start symbol of at least one second CORESET, indicating the slots where the second CORESET is located or the like.

In an embodiment, in the case where the number of symbols occupied by the first CORESET is 1, the index of the start symbol of the second CORESET is one of an index of the symbol occupied by the first CORESET increased by 1 or the index of the symbol occupied by the first CORESET increased by 2.

In an embodiment, the second CORESET occupies one symbol.

In an embodiment, the index of the start symbol of the second CORESET is as follows: a product of n and the number of symbols occupied by the second CORESET is subtracted from the number of symbols in the slots, and an offset value is subtracted, where a value of n is an integer greater than or equal to 1, and a value of the offset value is configured by a service node or is a default value.

It is to be noted that a symbol index in the slots is counted from 0.

In an embodiment, the number of symbols occupied by the second CORESET is greater than or equal to 2.

In an embodiment, the second CORESET satisfies at least one of the following: the number of symbols occupied by the second CORESET is the same as the number of symbols occupied by the first CORESET; or a frequency-domain resource position occupied by the second CORESET is the same as a frequency-domain resource position occupied by the first CORESET.

In an embodiment, in an NR system, a payload of a PBCH channel in a first SSB mainly includes first MIB information and eight bits of information (that is $\bar{a}_{\bar{A}+6}$, where a value of $\bar{A}$ is 8) of a physical layer. The first MIB information has one bit of reserved bit.

In the case where a maximum value L of the number of SSBs (a sum of the number of SSBs of different indexes) supported by the NR system within a period of 20 ms is 4 or 8, in the eight bits of information of the physical layer of the PBCH, $\bar{a}_{\bar{A}+6}$ and $\bar{a}_{\bar{A}+7}$ are reserved bits. Therefore, the payload of the PBCH may have up to three bits of reserved bits.

In the case where the maximum value L of the number of SSBs supported by the NR system within a period of 20 ms is 64, in the eight bits of information of the physical layer of the PBCH, $\bar{a}_{\bar{A}+6}$ and $\bar{a}_{\bar{A}+7}$ are occupied. Therefore, the payload of the PBCH may have up to one bit of reserved bit. The maximum value of the number of SSBs (the sum of the number of SSBs of different indexes) may be selected from {4, 8, 64}.

In the case where the target type terminal is supported in the NR system, the up to three bits of reserved bits of the PBCH in the first SSB may be used for indicating a corresponding CORESET configured for the target type terminal.

In an embodiment, the reserved bits in the payload of the PBCH may indicate at least one of the following: whether to configure the second CORESET of the target type terminal is indicated; or whether to configure the second CORESET of the target type terminal on an adjacent symbol behind a first CORESET configured for a non-target type terminal is indicated.

In an embodiment, in the case where the number of symbols occupied by the first CORESET is equal to 1, the second CORESET is configured on one or two symbols behind the first CORESET.

In an embodiment, in the case where the second CORESET is configured, the number of symbols used by the second CORESET and the size of the frequency-domain resource occupied by the second CORESET are the same as those used by the first CORESET.

In an embodiment, in the case where the second CORESET is configured, a position of the start symbol of the second CORESET is indicated, where the position of the start symbol of the second CORESET may include one or more positions.

For a multiplexing pattern 1 of the SSB and the CORESET 0, in the case where the second CORESET is configured, whether the second CORESET requires to be configured in both two slots like the first CORESET may include the following three cases: the second CORESET is only configured in a first slot; the second CORESET is only configured in a second slot; or the second CORESET is configured in both the two slots.

For the case of L=4 or 8, the CORESET corresponding to the target type terminal may be indicated by three bits of reserved bits in the payload of the PBCH and through a method of looking up in a table.

Table 1 is a first configuration table of the CORESET corresponding to the target type terminal. For example, there are fourteen symbols in one slot, where the number of a first symbol is 0, and the number of a last symbol is 13.

TABLE 1

First configuration table of the CORESET corresponding to the target type terminal

| Index | Whether to Support the Configuration of the Second CORESET | Slot(s) Where the Second CORESET Is Located | Start Symbol Index of the Second CORESET |
|---|---|---|---|
| 0 | No | \ | \ |
| 1 | Yes | One slot | 1, 2 |
| 2 | Yes | Two slots | 1, 2 |
| 3 | Yes | One slot | 10, 12 |
| 4 | Yes | Two slots | 10, 12 |
| 5 | Yes | One slot | 11 |
| 6 | Yes | Two slots | 11 |
| 7 | Yes | Two slots | 8, 11 |

In an embodiment, the indexes 1 and 2 are for a second CORESET with a length of one symbol, the indexes 3 and 4 are for a second CORESET with a length of two symbols, and the indexes 5, 6 and 7 are for a second CORESET with a length of three symbols.

For the case of L=4 or 8, the CORESET corresponding to the target type terminal may be indicated by two bits of reserved bits in the payload of the PBCH and through the method of looking up in a table.

Table 2 is a second configuration table of a CORESET corresponding to another target type terminal. For example, there are fourteen symbols in one slot, where the number of a first symbol is 0, and the number of a last symbol is 13.

TABLE 2

Second configuration table of a CORESET corresponding to another target type terminal

| Index | Whether to Support the Configuration of the Second CORESET | Slot Where the Second CORESET Is Located | Start Symbol Index of the Second CORESET |
|---|---|---|---|
| 0 | No | \ | \ |
| 1 | Yes | One slot | 1, 2 |
| 3 | Yes | One slot | 10, 12 |
| 7 | Yes | One slot | 8, 11 |

In an embodiment, the PDSCH is used for carrying RMSI.

In an embodiment, operation 104 is further included. In operation 104, a configuration scheme of the second CORESET is indicated by the first SSB.

In the present embodiment, the configuration scheme of the second CORESET includes at least one of the schemes described below.

(1) The additional SSB corresponding to the target type terminal is configured within the period or the time duration, where the additional SSB and the second CORESET have the association relationship (as shown in FIG. 2 or FIG. 3, the service node configures the additional SSB and the second CORESET for the target type terminal, and the target type terminal can detect the first CORESET corresponding to the first SSB and/or the second CORESET corresponding to the additional SSB).

(2) The second CORESET is configured by the first SSB (as shown in FIG. 4, the service node configures the second CORESET for the target type terminal, and the target type terminal can determine the second CORESET according to the first SSB).

(3) The symbols corresponding to the second CORESET are located in the slots where the first CORESET is located (as shown in FIG. 5, the service node configures the second CORESET for the target type terminal, the target type terminal can determine the second CORESET according to the first SSB, and the second CORESET and the first CORESET are located in the same slots).

In the embodiments of the present application, a detection method is further provided. A target type terminal accurately determines a CORESET and obtains control information of a downlink channel by detecting a corresponding CORESET, thereby completing an initial access procedure and improving the reliability of the detection of the CORESET.

It is to be noted that the detection method in the present embodiment and the resource set configuration method in the preceding embodiments belong to the same concept and an operation performed by the target type terminal in the present embodiment corresponds to the operation performed by the service node in the preceding embodiments. For technical details not described in detail in the present embodiment, reference may be made to any one of the preceding embodiments.

Figure 6:
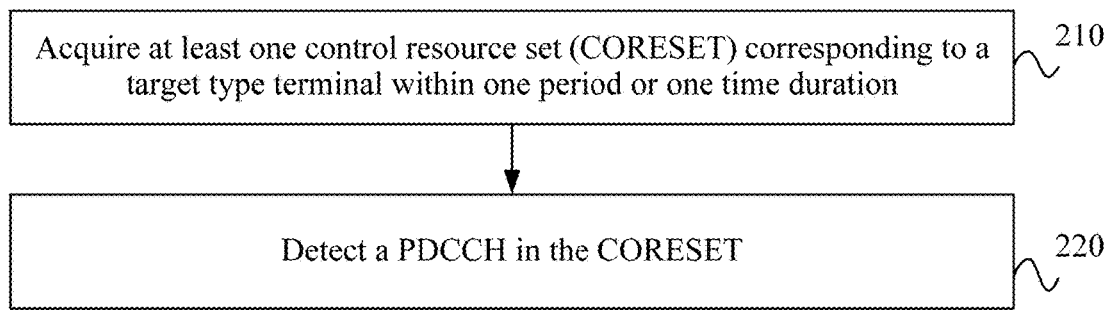
FIG. 6 is a flowchart of a detection method according to an embodiment.

FIG. 6 is a flowchart of a detection method according to an embodiment. As shown in FIG. 6, the method according to the present embodiment includes operations 210 and 220.

In operation 210, at least one CORESET corresponding to a target type terminal is learned within one period or one time duration.

In operation 220, a PDCCH is detected in the at least one CORESET.

In the present embodiment, a service node considers a capability of the target type terminal and configures the corresponding CORESET for the target type terminal. The target type terminal can detect the PDCCH in the CORESET by detecting the corresponding CORESET.

In an embodiment, the target type terminal is configured with a corresponding additional SSB within the period or the time duration, where the additional SSB and a second CORESET have an association relationship.

In an embodiment, the CORESET includes at least one of a first CORESET corresponding to at least one first SSB within the period or the time duration or at least one second CORESET.

In an embodiment, in the case where the number of additional SSBs is less than the number of first SSBs, indexes of the additional SSBs are 0 to (N2−1), where N2 is the number of additional SSBs.

In an embodiment, a time domain position of the second CORESET is that a set offset value is added based on a time domain position of the first CORESET corresponding to the first SSB.

In an embodiment, for the target type terminal, the number of repetitions of a PDSCH is indicated by first DCI; alternatively, the number of repetitions of the PDSCH is indicated by second DCI; alternatively, the number of repetitions of the PDSCH is the same as the number of first CORESETs configured within the period or the time duration; alternatively, the number of repetitions of the PDSCH is the same as the number of second CORESETs configured within the period or the time duration; alternatively, the number of repetitions of the PDSCH is the same as a sum of the number of first CORESETs configured within the period or the time duration and the number of second CORESETs configured within the period or the time duration; alternatively, in the case where the corresponding additional SSB is configured for the target type terminal, the number of repetitions of the PDSCH is the same as the number of repetitions of the additional SSB within the period or the time duration; alternatively, in the case where the corresponding additional SSB is configured for the target type terminal, the number of repetitions of the PDSCH is the same as a sum of the number of repetitions of the first SSB within the period or the time duration and the number of repetitions of the additional SSB within the period or the time duration.

In an embodiment, in the case where the CORESET corresponding to the target type terminal includes a first CORESET corresponding to at least one first SSB within a period or a time duration and at least one second CORESET, at least one of the following is satisfied: the first DCI scheduling a non-target type terminal and the second DCI scheduling the target type terminal carry the same information; or first MIB information in the first SSB is consistent with second MIB information in the additional SSB.

In an embodiment, in the case where the CORESET corresponding to the target type terminal includes a first CORESET corresponding to at least one first SSB within a period or a time duration and at least one second CORESET, a PDCCH candidate satisfies at least one of the following: the PDCCH candidate is located in the first CORESET corresponding to the at least one first SSB; the PDCCH candidate is located in a PDCCH of the at least one second CORESET; or the PDCCH candidate is located in a set consisting of the first CORESET corresponding to the at least one first SSB and the at least one second CORESET.

In an embodiment, the PDCCH candidate is located in the PDCCH of the at least one second CORESET.

In the case where the number P1 of the at least one second CORESET is greater than 1, a (j+1)-th PDCCH candidate is located in second CORESETs whose indexes are j*P1/J to (j+1)*P1/J−1 among the P1 second CORESETs, where a value of J is at least one of 2, 4, 6, 8, 16 or 24, and j is greater than or equal to 0 and less than or equal to (J−1).

In the present embodiment, the P1 second CORESETs are numbered from 0 to (P1−1). The P1 second CORESETs may be preferentially numbered in order of time domain. "*" denotes a multiplication operation, and "/" denotes a division operation.

In an embodiment, if P1 is not divisible by J, that is, P1/J is a non-integer. Therefore, P1/J may be replaced by rounding down or rounding up P1/J.

In an embodiment, the PDCCH candidate is located in the set consisting of the first CORESET corresponding to the at least one first SSB and the at least one second CORESET.

In the case where the number P2 of CORESETs in the set consisting of the first CORESET corresponding to the at least one first SSB and the at least one second CORESET is greater than 1, a (j+1)-th PDCCH candidate is located in CORESETs whose indexes are j*P2/J to (j+1)*P2/J−1 among the P2 CORESETs, A value of J is at least one of 2, 4, 6, 8, 16 or 24, and j is greater than or equal to 0 and less than or equal to (J−1).

In the present embodiment, the P2 CORESETs are numbered from 0 to (P2−1). The P2 CORESETs may be preferentially numbered in order of time domain. "*" denotes a multiplication operation, and "/" denotes a division operation.

In an embodiment, if P2 is not divisible by J, that is, P2/J is a non-integer. Therefore, P2/J may be replaced by rounding down or rounding up P2/J.

In an embodiment, in the case where the CORESET corresponding to the target type terminal includes at least one second CORESET within a period or a time duration, the first SSB and the additional SSB satisfy at least one of the following: a sequence used by a synchronization signal in the first SSB is different from a sequence used by a synchronization signal in the additional SSB; a relative position between a PSS and an SSS in the first SSB is different from a relative position between a PSS and an SSS in the additional SSB; or a scrambling operation is performed on a PBCH in the additional SSB using a dedicated scrambling code of the target type terminal.

In an embodiment, for the target type terminal, an index of a start slot of the PDSCH is an index of a last slot among slots where the second CORESET is located plus N, where N is an integer greater than or equal to 0, and a value of N is configured by a service node or is a default value.

In an embodiment, the second CORESET satisfies at least one of the following: the second CORESET is configured by the first SSB; or a start slot of the second CORESET is determined according to a predetermined rule or indicated by the first SSB.

In an embodiment, the slots where the second CORESET is located include slots within the period or the time duration and do not include at least one of: a slot occupied by the first SSB; a slot occupied by the first SSB, where the first CORESET exists in the slot; or slots where the first CORESET is located.

In an embodiment, the slots where the second CORESET is located include the slots within the period or the time duration, and an index of a start slot is an index of a last slot among the slots where the first CORESET is located plus G1, where G1 is greater than or equal to 0.

In an embodiment, slots whose indexes are Offset+I*K(I) to Offset+(I+1)*K(I)−1 among a set of the slots where the second CORESET is located are slots where a second CORESET corresponding to a first SSB with an index of I is located. In the set of the slots where the second CORESET is located, a slot index is numbered from 0, and K(I) is the number of slots occupied by the second CORESET corresponding to the first SSB with an index of I. Offset is an offset amount, where a value of the offset amount is configured by a service node or is a default value.

In an embodiment, in the case where indexes of the slots configured for the second CORESET corresponding to the first SSB with an index of I exceed a slot index range of the set of the slots where the second CORESET is located, no second CORESET is configured for the first SSB with an index of I.

In an embodiment, the number of slots occupied by the second CORESET corresponding to the first SSB with an index of I among second CORESETs is the same as the number of slots occupied by a first CORESET corresponding to the first SSB with the same index.

In an embodiment, the first SSB is used for indicating at least one of the following: whether the first SSB configures the second CORESET is indicated; the number of slots occupied by the second CORESET corresponding to the first SSB is indicated; or positions of the slots occupied by the second CORESET corresponding to the first SSB are indicated.

In an embodiment, in the case where a gap between a frequency-domain resource position of the first SSB and a frequency domain position of the first CORESET is greater than a set value, a frequency domain position of the second CORESET is located between the frequency-domain resource position of the first SSB and the frequency domain position of the first CORESET.

In an embodiment, the set value is determined by at least one of the following: being configured by a service node; being set as a default value; or being determined according to a subcarrier spacing of the second CORESET.

In an embodiment, the subcarrier spacing of the second CORESET is the same as subcarrier spacing of the first CORESET.

In an embodiment, the frequency domain position of the second CORESET is adjacent to the frequency domain position of the first CORESET.

In an embodiment, a size of the frequency-domain resource occupied by the second CORESET is a maximum value of a frequency-domain resource configurable for the second CORESET, where the maximum value satisfies a value less than or equal to the gap.

In an embodiment, symbols corresponding to the second CORESET are located in the slots where the first CORESET is located.

In an embodiment, the symbols corresponding to the second CORESET are indicated by configuration information of the second CORESET in the first SSB.

The configuration information of the second CORESET is further used for indicating at least one of the following: whether to configure the second CORESET is indicated; start symbol index information of at least one second CORESET is indicated; or when the number of slots where the first CORESET is located is greater than 1, the slots where the second CORESET is located are indicated.

In an embodiment, in the case where the number of symbols occupied by the first CORESET is 1, the index of the start symbol of the second CORESET is one of an index of the symbol occupied by the first CORESET increased by 1 or the index of the symbol occupied by the first CORESET increased by 2.

In an embodiment, the second CORESET occupies one symbol.

In an embodiment, the index of the start symbol of the second CORESET is as follows: a product of n and the number of symbols occupied by the second CORESET is subtracted from the number of symbols in the slots, and an offset value is subtracted, where a value of n is an integer greater than or equal to 1, and a value of the offset value is configured by a service node or is a default value.

In an embodiment, the number of symbols occupied by the second CORESET is greater than or equal to 2.

In an embodiment, the second CORESET satisfies at least one of the following: the number of symbols occupied by the second CORESET is the same as the number of symbols occupied by the first CORESET; or a frequency-domain resource position occupied by the second CORESET is the same as a frequency-domain resource position occupied by the first CORESET.

In an embodiment, the first SSB is used for indicating a configuration scheme of the second CORESET.

The configuration scheme of the second CORESET includes at least one of the schemes described below.

The additional SSB corresponding to the target type terminal is configured within the period or the time duration, where the additional SSB and the second CORESET have the association relationship.

The second CORESET is configured by the first SSB.

The symbols corresponding to the second CORESET are located in the slots where the first CORESET is located.

Figure 7:
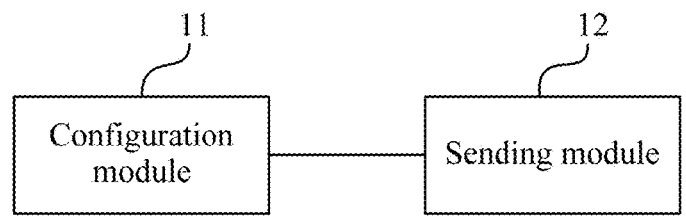
FIG. 7 is a structure diagram of a resource set configuration apparatus according to an embodiment.

Embodiments of the present application further provide a resource set configuration apparatus. FIG. 7 is a structure diagram of a resource set configuration apparatus according to an embodiment. As shown in FIG. 7, the resource set configuration apparatus includes a configuration module 11 and a sending module 12.

The configuration module 11 is configured to configure at least one CORESET corresponding to a target type terminal within one period or one time duration.

The sending module 12 is configured to send a PDCCH in the at least one CORESET.

The resource set configuration apparatus in the present embodiment configures the corresponding CORESET for the target type terminal so that the flexibility and reliability of the configuration of the CORESET are improved and the target type terminal can effectively detect the corresponding CORESET and accurately obtain control information of a downlink channel, thereby completing an initial access procedure.

In an embodiment, the CORESET includes at least one of a first CORESET corresponding to at least one first SSB within the period or the time duration or at least one second CORESET.

In an embodiment, the configuration module 11 is further configured to configure an additional SSB corresponding to the target type terminal within the period or the time duration, where the additional SSB and the second CORESET have an association relationship.

In an embodiment, the number of additional SSBs is less than or equal to the number of first SSBs.

In an embodiment, in the case where the number of additional SSBs is less than the number of first SSBs, indexes of the additional SSBs are 0 to (N2−1), where N2 is the number of additional SSBs.

In an embodiment, a time domain position of the second CORESET is that a set offset value is added based on a time domain position of the first CORESET.

In an embodiment, for the target type terminal, the number of repetitions of a PDSCH is indicated by first DCI; alternatively, the number of repetitions of the PDSCH is indicated by second DCI; alternatively, the number of repetitions of the PDSCH is the same as the number of first CORESETs configured within the period or the time duration; alternatively, the number of repetitions of the PDSCH is the same as the number of second CORESETs configured within the period or the time duration; alternatively, the number of repetitions of the PDSCH is the same as a sum of the number of first CORESETs configured within the period or the time duration and the number of second CORESETs configured within the period or the time duration; alternatively, in the case where the corresponding additional SSB is configured for the target type terminal, the number of repetitions of the PDSCH is the same as the number of repetitions of the additional SSB within the period or the time duration; alternatively, in the case where the corresponding additional SSB is configured for the target type terminal, the number of repetitions of the PDSCH is the same as a sum of the number of repetitions of the first SSB within the period or the time duration and the number of repetitions of the additional SSB within the period or the time duration.

In an embodiment, the first DCI scheduling a non-target type terminal and the second DCI scheduling the target type terminal carry the same information.

In an embodiment, in the case where the corresponding additional SSB is configured for the target type terminal, first MIB information in the first SSB is consistent with second MIB information in the additional SSB.

In an embodiment, in the case where the corresponding additional SSB is configured for the target type terminal, the first SSB and the additional SSB satisfy at least one of the following: a sequence used by a synchronization signal in the first SSB is different from a sequence used by a synchronization signal in the additional SSB; a relative position between a PSS and an SSS in the first SSB is different from a relative position between a PSS and an SSS in the additional SSB; or a scrambling operation is performed on a PBCH in the additional SSB using a dedicated scrambling code of the target type terminal.

In an embodiment, for the target type terminal, an index of a start slot of the PDSCH is an index of a last slot among slots where the second CORESET is located plus N, where N is an integer greater than or equal to 0, and a value of N is configured by a service node or is a default value.

In an embodiment, the second CORESET is configured by the first SSB, and a start slot of the second CORESET is determined according to a predetermined rule or indicated by the first SSB.

In an embodiment, slots where the second CORESET is located include slots within the period or the time duration and do not include at least one of: a slot occupied by the first SSB; a slot occupied by the first SSB, where the first CORESET exists in the slot; or slots where the first CORESET is located.

In an embodiment, the slots where the second CORESET is located include the slots within the period or the time duration, and an index of a start slot is an index of a last slot among the slots where the first CORESET is located plus G1 slots, where G1 is greater than or equal to 0.

In an embodiment, slots whose indexes are Offset+I*K(I) to Offset+(I+1)*K(I)−1 among a set of the slots where the second CORESET is located are slots where a second CORESET corresponding to a first SSB with an index of I is located.

In the set of the slots where the second CORESET is located, a slot index is numbered from 0, and K(I) is the number of slots occupied by the second CORESET corresponding to the first SSB with an index of I.

Offset is an offset amount, where a value of the offset amount is configured by a service node or is a default value.

In an embodiment, the configuration module 11 is further configured to configure the slots for the second CORESET corresponding to the first SSB with an index of I, and in the case where indexes of the configured slots exceed a slot index range of the set of the slots where the second CORESET is located, no second CORESET is configured for the first SSB with an index of I.

In an embodiment, the number of slots occupied by the second CORESET corresponding to the first SSB with an index of I among second CORESETs is the same as the number of slots occupied by a first CORESET corresponding to the first SSB with the same index.

In an embodiment, the resource set configuration apparatus further includes an indication module. The indication module is configured to indicate, through the first SSB, at least one of the following: whether the first SSB configures the second CORESET is indicated; the number of slots occupied by the second CORESET corresponding to the first SSB is indicated; or positions of the slots occupied by the second CORESET corresponding to the first SSB are indicated.

In an embodiment, in the case where a gap between a frequency-domain resource position of the first SSB and a frequency domain position of the first CORESET is greater than a set value, a frequency domain position of the second CORESET is located between the frequency-domain resource position of the first SSB and the frequency domain position of the first CORESET.

In an embodiment, the set value is determined by at least one of the following: being configured by a service node; being set as a default value; or being determined according to a subcarrier spacing of the second CORESET.

In an embodiment, the subcarrier spacing of the second CORESET is the same as a subcarrier spacing of the first CORESET.

In an embodiment, the frequency domain position of the second CORESET is adjacent to the frequency domain position of the first CORESET.

In an embodiment, a size of the frequency-domain resource occupied by the second CORESET is a maximum value of a frequency-domain resource configurable for the second CORESET, where the maximum value satisfies a value less than or equal to the gap.

In an embodiment, symbols corresponding to the second CORESET are located in the slots where the first CORESET is located.

In an embodiment, the symbols corresponding to the second CORESET are indicated by configuration information of the first CORESET in the first SSB.

In an embodiment, in the case where the corresponding additional SSB is configured for the target type terminal, the symbols corresponding to the second CORESET are indicated by configuration information of the second CORESET in the additional SSB.

In an embodiment, in the case where the corresponding additional SSB is configured for the target type terminal, the symbols corresponding to the second CORESET are indicated by configuration information of a second CORESET in a second MIB of the additional SSB, where the configuration information of the second CORESET is used for indicating a start symbol corresponding to the second CORESET.

In an embodiment, the second CORESET satisfies at least one of the following: the number of symbols occupied by the second CORESET is the same as the number of symbols occupied by the first CORESET; or a frequency-domain resource position occupied by the second CORESET is the same as a frequency-domain resource position occupied by the first CORESET.

In an embodiment, the PDSCH is used for carrying remaining RMSI.

The resource set configuration apparatus provided in the present embodiment and the resource set configuration method applied to a terminal provided in the preceding embodiments belong to the same concept. For technical details not described in detail in the present embodiment, reference may be made to any one of the preceding embodiments. The present embodiment has the same beneficial effects as the resource set configuration method applied to a terminal performed.

Figure 8:
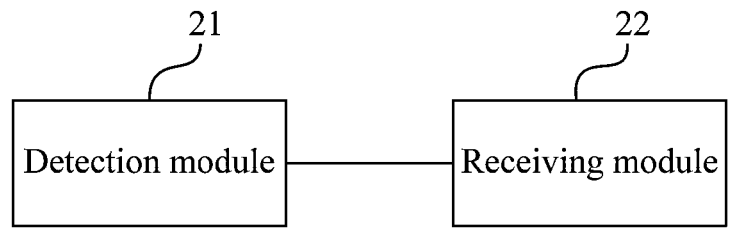
FIG. 8 is a structure diagram of a detection apparatus according to an embodiment.

Embodiments of the present application further provide a detection apparatus. FIG. 8 is a structure diagram of a detection apparatus according to an embodiment. As shown in FIG. 8, the detection apparatus includes a detection module 21 and a receiving module 22.

The detection module 21 is configured to learn at least one CORESET corresponding to a target type terminal within one period or one time duration.

The receiving module 22 is configured to detect a PDCCH in the at least one CORESET.

The detection apparatus in the present embodiment accurately detects the PDCCH and obtains control information of a downlink channel by acquiring the CORESET corresponding to the target type terminal, thereby completing an initial access procedure and improving the reliability of the detection of the CORESET.

In an embodiment, the CORESET includes at least one of a first CORESET corresponding to at least one first SSB within the period or the time duration or at least one second CORESET.

In an embodiment, the target type terminal is configured with a corresponding additional SSB within the period or the time duration, where the additional SSB and the second CORESET have an association relationship.

In an embodiment, in the case where the corresponding additional SSB is configured for the target type terminal and the number of additional SSBs is less than the number of first SSBs, indexes of the additional SSBs are 0 to (N2−1), where N2 is the number of additional SSBs.

In an embodiment, a time domain position of the second CORESET is that a set offset value is added based on a time domain position of the first CORESET corresponding to the first SSB.

In an embodiment, for the target type terminal, the number of repetitions of a PDSCH is indicated by first DCI; alternatively, the number of repetitions of the PDSCH is indicated by second DCI; alternatively, the number of repetitions of the PDSCH is the same as the number of first CORESETs configured within the period or the time duration; alternatively, the number of repetitions of the PDSCH is the same as the number of second CORESETs configured within the period or the time duration; alternatively, the number of repetitions of the PDSCH is the same as a sum of the number of first CORESETs configured within the period or the time duration and the number of second CORESETs configured within the period or the time duration; alternatively, in the case where the corresponding additional SSB is configured for the target type terminal, the number of repetitions of the PDSCH is the same as the number of repetitions of the additional SSB within the period or the time duration; alternatively, in the case of where the corresponding additional SSB is configured for the target type terminal, the number of repetitions of the PDSCH is the same as a sum of the number of repetitions of the first SSB within the period or the time duration and the number of repetitions of the additional SSB within the period or the time duration.

In an embodiment, in the case where the CORESET corresponding to the target type terminal includes a first CORESET corresponding to at least one first SSB within the period or the time duration and at least one second CORESET, at least one of the following is satisfied: the first DCI scheduling a non-target type terminal and the second DCI scheduling the target type terminal carry the same information; or first MIB information in the first SSB is consistent with second MIB information in the additional SSB.

In an embodiment, in the case where the CORESET corresponding to the target type terminal includes a first CORESET corresponding to at least one first SSB within the period or the time duration and at least one second CORESET, a PDCCH candidate satisfies at least one of the following: the PDCCH candidate is located in the first CORESET corresponding to the at least one first SSB; the PDCCH candidate is located in a PDCCH of the at least one second CORESET; or the PDCCH candidate is located in a set consisting of the first CORESET corresponding to the at least one first SSB and the at least one second CORESET.

In an embodiment, the PDCCH candidate is located in the PDCCH of the at least one second CORESET.

In the case where the number P1 of the at least one second CORESET is greater than 1, a (j+1)-th PDCCH candidate is located in second CORESETs whose indexes are j*P1/J to (j+1)*P1/J−1 among the P1 second CORESETs, where a value of J is at least one of 2, 4, 6, 8, 16 or 24, and j is greater than or equal to 0 and less than or equal to (J−1).

In an embodiment, the PDCCH candidate is located in the set consisting of the first CORESET corresponding to the at least one first SSB and the at least one second CORESET.

In the case where the number P2 of CORESETs in the set consisting of the first CORESET corresponding to the at least one first SSB and the at least one second CORESET is greater than 1, a (j+1)-th PDCCH candidate is located in CORESETs whose indexes are j*P2/J to (j+1)*P2/J−1 among the P2 CORESETs, where a value of J is at least one of 2, 4, 6, 8, 16 or 24, and j is greater than or equal to 0 and less than or equal to (J−1).

In an embodiment, in the case where the CORESET corresponding to the target type terminal includes at least one second CORESET within the period or the time duration, the first SSB and the additional SSB satisfy at least one of the following: a sequence used by a synchronization signal in the first SSB is different from a sequence used by a synchronization signal in the additional SSB; a relative position between a PSS and an SSS in the first SSB is different from a relative position between a PSS and an SSS in the additional SSB; or a scrambling operation is performed on a PBCH in the additional SSB using a dedicated scrambling code of the target type terminal.

In an embodiment, for the target type terminal, an index of a start slot of the PDSCH is an index of a last slot among slots where the second CORESET is located plus N, where N is an integer greater than or equal to 0, and a value of N is configured by a service node or is a default value.

In an embodiment, the second CORESET satisfies at least one of the following: the second CORESET is configured by the first SSB; or a start slot of the second CORESET is determined according to a predetermined rule or indicated by the first SSB.

In an embodiment, the slots where the second CORESET is located include slots within the period or the time duration and do not include at least one of: a slot occupied by the first SSB; a slot occupied by the first SSB, where the first CORESET exists in the slot; or slots where the first CORESET is located.

In an embodiment, the slots where the second CORESET is located include the slots within the period or the time duration, and an index of a start slot is an index of a last slot among the slots where the first CORESET is located plus G1, where G1 is greater than or equal to 0.

In an embodiment, slots whose indexes are Offset+I*K(I) to Offset+(I+1)*K(I)−1 among a set of the slots where the second CORESET is located are slots where a second CORESET corresponding to a first SSB with an index of I is located. In the set of the slots where the second CORESET is located, a slot index is numbered from 0, and K(I) is the number of slots occupied by the second CORESET corresponding to the first SSB with an index of I. Offset is an offset amount, where a value of the offset amount is configured by a service node or is a default value.

In an embodiment, in the case where indexes of the slots configured for the second CORESET corresponding to the first SSB with an index of I exceed a slot index range of the set of the slots where the second CORESET is located, no additional SSB is configured for the first SSB with an index of I.

In an embodiment, the number of slots occupied by the second CORESET corresponding to the first SSB with an index of I among second CORESETs is the same as the number of slots occupied by a first CORESET corresponding to the first SSB with the same index.

In an embodiment, the first SSB is used for indicating at least one of the following: whether the first SSB configures the second CORESET is indicated; the number of slots occupied by the second CORESET corresponding to the first SSB is indicated; or positions of the slots occupied by the second CORESET corresponding to the first SSB are indicated.

In an embodiment, in the case where a gap between a frequency-domain resource position of the first SSB and a frequency domain position of the first CORESET is greater than a set value, a frequency domain position of the second CORESET is located between the frequency-domain resource position of the first SSB and the frequency domain position of the first CORESET.

In an embodiment, the set value is determined by at least one of the following: being configured by a service node; being set as a default value; or being determined according to a subcarrier spacing of the second CORESET.

In an embodiment, the subcarrier spacing of the second CORESET is the same as a subcarrier spacing of the first CORESET.

In an embodiment, the frequency domain position of the second CORESET is adjacent to the frequency domain position of the first CORESET.

In an embodiment, a size of the frequency-domain resource occupied by the second CORESET is a maximum value of a frequency-domain resource configurable for the second CORESET, where the maximum value satisfies a value less than or equal to the gap.

In an embodiment, symbols corresponding to the second CORESET are located in the slots where the first CORESET is located.

In an embodiment, the symbols corresponding to the second CORESET are indicated by configuration information of the second CORESET in the first SSB.

The configuration information of the second CORESET is further used for indicating at least one of the following: whether to configure the second CORESET is indicated; start symbol index information of at least one second CORESET is indicated; or when the number of slots where the first CORESET is located is greater than 1, the slots where the second CORESET is located are indicated.

In an embodiment, in the case where the number of symbols occupied by the first CORESET is 1, the index of the start symbol of the second CORESET is one of an index of the symbol occupied by the first CORESET increased by 1 or the index of the symbol occupied by the first CORESET increased by 2.

In an embodiment, the second CORESET occupies one symbol.

In an embodiment, the index of the start symbol of the second CORESET is as follows: a product of n and the number of symbols occupied by the second CORESET is subtracted from the number of symbols in the slots, and an offset value is subtracted, where a value of n is an integer greater than or equal to 1, and a value of the offset value is configured by a service node or is a default value.

In an embodiment, the number of symbols occupied by the second CORESET is greater than or equal to 2.

In an embodiment, the second CORESET satisfies at least one of the following: the number of symbols occupied by the second CORESET is the same as the number of symbols occupied by the first CORESET; or a frequency-domain resource position occupied by the second CORESET is the same as a frequency-domain resource position occupied by the first CORESET.

In an embodiment, the first SSB is used for indicating a configuration scheme of the second CORESET.

The configuration scheme of the second CORESET includes at least one of the schemes described below.

The additional SSB corresponding to the target type terminal is configured within the period or the time duration, where the additional SSB and the second COREST have the association relationship.

The second CORESET is configured by the first SSB.

The symbols corresponding to the second CORESET are located in the slots where the first CORESET is located.

The detection apparatus provided in the present embodiment and the detection method applied to a terminal provided in the preceding embodiments belong to the same concept. For technical details not described in detail in the present embodiment, reference may be made to any one of the preceding embodiments. The present embodiment has the same beneficial effects as the detection method applied to a terminal performed.

Embodiments of the present application further provide a service node. The above resource set configuration method applied to a service node may be performed by a resource set configuration apparatus. The resource set configuration apparatus may be implemented by software and/or hardware and integrated in the service node.

Figure 9:
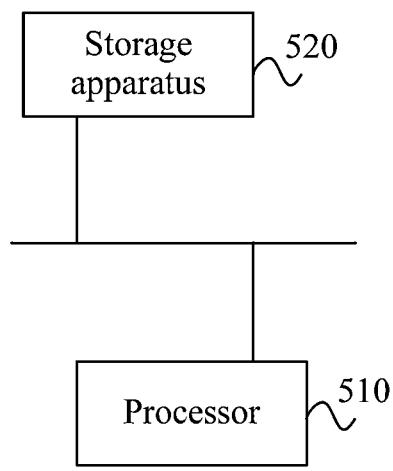
FIG. 9 is a structure diagram of hardware of a service node according to an embodiment.

FIG. 9 is a structure diagram of hardware of a service node according to an embodiment. As shown in FIG. 9, the service node provided in the present embodiment includes a processor 510 and a storage apparatus 520. The service node may include one or more processors. One processor 510 is shown as an example in FIG. 9. The processor 510 and the storage apparatus 520 in the device may be connected via a bus or other manners. The connection via a bus is shown as an example in FIG. 9.

One or more programs are executed by one or more processors 510 to cause the one or more processors to implement the resource set configuration method applied to a service node in any one of the preceding embodiments.

As a computer-readable storage medium, the storage apparatus 520 in the service node may be configured to store one or more programs which may be software programs, computer-executable programs and modules, such as program instructions/modules (for example, the modules in the resource set configuration apparatus including a configuration module 11 and a sending module 12, as shown in FIG. 7) corresponding to the resource set configuration method applied to a service node in the embodiments of the present disclosure. The processor 510 executes software programs, instructions and modules stored in the storage apparatus 520 to perform various function applications and data processing of the service node, that is, to implement the resource set configuration method in the preceding method embodiments.

The storage apparatus 520 mainly includes a program storage region and a data storage region. The program storage region may store an operating system and an application program required by at least one function. The data storage region may store data (such as a CORESET and a target type terminal in the preceding embodiments) created based on the use of the device. Additionally, the storage apparatus 520 may include a high-speed random-access memory and may further include a non-volatile memory, such as at least one magnetic disk memory, a flash memory or another non-volatile solid-state memory. In some examples, the storage apparatus 520 may further include memories remotely disposed relative to the processor 510, and these remote memories may be connected to the service node via a network. Examples of the preceding network include, but are not limited to, the Internet, an intranet, a local area network, a mobile communication network and a combination thereof.

When the one or more programs included in the service node are executed by the one or more processors 510, the following operations are implemented: at least one CORESET corresponding to a target type terminal is configured within one period or one time duration, and a PDCCH is sent in the at least one CORESET.

The service node provided in the present embodiment and the resource set configuration method applied to a service node or the query method applied to a service node provided in the preceding embodiments belong to the same concept. For technical details not described in detail in the present embodiment, reference may be made to any one of the preceding embodiments. The present embodiment has the same beneficial effects as the resource set configuration method or the query method performed.

Embodiments of the present application further provide a terminal. The above detection method applied to a terminal may be performed by a detection apparatus. The resource set detection apparatus may be implemented by software and/or hardware and integrated in the terminal.

Figure 10:
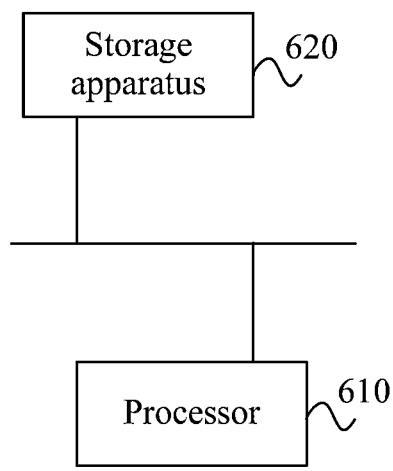
FIG. 10 is a structure diagram of hardware of a terminal according to an embodiment.

FIG. 10 is a structure diagram of hardware of a terminal according to an embodiment. As shown in FIG. 10, the terminal provided in the present embodiment includes a processor 610 and a storage apparatus 620. The terminal may include one or more processors. One processor 610 is shown as an example in FIG. 10. The processor 610 and the storage apparatus 620 in the device may be connected via a bus or other manners. The connection via a bus is shown as an example in FIG. 10.

One or more programs are executed by one or more processors 610 to cause the one or more processors to implement the detection method applied to a terminal in any one of the preceding embodiments.

As a computer-readable storage medium, the storage apparatus 620 in the terminal may be configured to store one or more programs which may be software programs, computer-executable programs and modules, such as program instructions/modules (for example, the modules in the detection apparatus including a detection module 21 and a receiving module 22, as shown FIG. 8) corresponding to the detection method applied to a terminal in the embodiments of the present disclosure. The processor 610 executes software programs, instructions and modules stored in the storage apparatus 620 to perform various function applications and data processing of the terminal, that is, to implement the detection method applied to a terminal in the preceding method embodiments.

The storage apparatus 620 mainly includes a program storage region and a data storage region. The program storage region may store an operating system and an application program required by at least one function. The data storage region may store data (such as a CORESET and a target type terminal in the preceding embodiments) created based on the use of the device. Additionally, the storage apparatus 620 may include a high speed random-access memory and may further include a non-volatile memory, such as at least one magnetic disk memory, a flash memory or another non-volatile solid-state memory. In some examples, the storage apparatus 620 may further include memories remotely disposed relative to the processor 610, and these remote memories may be connected to the terminal via a network. Examples of the preceding network include, but are not limited to, the Internet, an intranet, a local area network, a mobile communication network and a combination thereof.

When the one or more programs included in the terminal are executed by the one or more processors 610, the following operations are implemented: at least one CORESET corresponding to a target type terminal is learned within one period or one time duration, and a PDCCH is detected in the at least one CORESET.

The terminal provided in the present embodiment and the detection method applied to a terminal or the notification method applied to a terminal provided in the preceding embodiments belong to the same concept. For technical details not described in detail in the present embodiment, reference may be made to any one of the preceding embodiments. The present embodiment has the same beneficial effects as the detection method applied to a terminal or the notification method applied to a terminal performed.

Embodiments of the present application further provide a storage medium including computer-executable instructions, where when executed by a computer processor, the computer-executable instructions are used for performing a resource set configuration method or a detection method.

The resource set configuration method includes: configuring at least one CORESET corresponding to a target type terminal within one period or one time duration; and sending a PDCCH in the at least one CORESET.

The detection method includes: acquiring at least one CORESET corresponding to a target type terminal within one period or one time duration; and detecting a PDCCH in the at least one CORESET.

From the preceding description of embodiments, it is apparent to those skilled in the art that the present application may be implemented by use of software and general-purpose hardware or may be implemented by hardware. Based on this understanding, the technical solutions of the present application may be embodied in the form of a software product. The computer software product may be stored in a computer-readable storage medium, such as a floppy disk, a read-only memory (ROM), a random-access memory (RAM), a flash memory, a hard disk or an optical disk of a computer and includes multiple instructions for causing a computer device (which may be a personal computer, a server or a network device) to perform the method in any embodiment of the present application.

The preceding are only example embodiments of the present application and not intended to limit the scope of the present application.

A block diagram of any logic flow in the drawings of the present application may represent program steps, or may represent interconnected logic circuits, modules and functions, or may represent a combination of program steps and logic circuits, modules and functions. Computer programs may be stored in a memory. The memory may be of any type appropriate for the local technical environment and may be implemented by using any appropriate data storage technology, such as, but not limited to, a read-only memory (ROM), a random-access memory (RAM), an optical memory device and system (a digital video disc (DVD) or a compact disk (CD)) and the like. Computer-readable media may include non-transitory storage media. A data processor may be of any type appropriate for the local technical environment, such as, but not limited to, a general-purpose computer, a special-purpose computer, a microprocessor, a digital signal processor (DSP), an application-specific integrated circuit (ASIC), a field-programmable gate array (FGPA) and a processor based on a multi-core processor architecture.

Embodiments of the present application provide a resource set configuration method. The resource set configuration method includes the items described below.

In item 1, at least one CORESET corresponding to a target type terminal is configured within one period or one time duration, and a PDCCH is sent in the at least one CORESET.

In item 2, according to the method of item 1, the CORESET includes at least one of a first CORESET corresponding to at least one first SSB within the period or the time duration or at least one second CORESET.

In item 3, according to the method of item 2, the method further includes: configuring an additional SSB corresponding to the target type terminal within the period or the time duration, where the additional SSB and the second CORESET have an association relationship.

In item 4, according to the method of item 3, in the case where the number of additional SSBs is less than the number of first SSBs, indexes of the additional SSBs are 0 to (N2−1), where N2 is the number of additional SSBs.

In item 5, according to the method of item 2, a time domain position of the second CORESET is that a set offset value is added based on a time domain position of the first CORESET.

In item 6, according to the method of item 2, for the target type terminal, the number of repetitions of a PDSCH is indicated by first DCI; alternatively, the number of repetitions of the PDSCH is indicated by second DCI; alternatively, the number of repetitions of the PDSCH is the same as the number of first CORESETs configured within the period or the time duration; alternatively, the number of repetitions of the PDSCH is the same as the number of second CORESETs configured within the period or the time duration; alternatively, the number of repetitions of the PDSCH is the same as a sum of the number of first CORESETs configured within the period or the time duration and the number of second CORESETs configured within the period or the time duration; alternatively, in the case where a corresponding additional SSB is configured for the target type terminal, the number of repetitions of the PDSCH is the same as the number of repetitions of the additional SSB within the period or the time duration; alternatively, in the case where the corresponding additional SSB is configured for the target type terminal, the number of repetitions of the PDSCH is the same as a sum of the number of repetitions of the first SSB within the period or the time duration and the number of repetitions of the additional SSB within the period or the time duration.

In item 7, according to the method of item 2, first DCI scheduling a non-target type terminal and second DCI scheduling the target type terminal carry the same information.

In item 8, according to the method of item 2, in the case where a corresponding additional SSB is configured for the target type terminal, first MIB information in the first SSB is consistent with second MIB information in the additional SSB.

In item 9, according to the method of item 2, in the case where a corresponding additional SSB is configured for the target type terminal, the first SSB and the additional SSB satisfy at least one of the following: a sequence used by a synchronization signal in the first SSB is different from a sequence used by a synchronization signal in the additional SSB; a relative position between a PSS and an SSS in the first SSB is different from a relative position between a PSS and an SSS in the additional SSB; or a scrambling operation is performed on a PBCH in the additional SSB using a dedicated scrambling code of the target type terminal.

In item 10, according to the method of item 2, for the target type terminal, an index of a start slot of a PDSCH is an index of a last slot among slots where the second CORESET is located plus N, where N is an integer greater than or equal to 0, and a value of N is configured by a service node or is a default value.

In item 11, according to the method of item 2, the second CORESET is configured by the first SSB, and a start slot of the second CORESET is determined according to a predetermined rule or indicated by the first SSB.

In item 12, according to the method of item 2, slots where the second CORESET is located include slots within the period or the time duration and do not include at least one of: a slot occupied by the first SSB; a slot occupied by the first SSB, where the first CORESET exists in the slot; or slots where the first CORESET is located.

In item 13, according to the method of item 2, slots where the second CORESET is located include slots within the period or the time duration, and an index of a start slot is an index of a last slot among slots where the first CORESET is located plus G1, where G1 is greater than or equal to 0.

In item 14, according to the method of item 12 or 13, slots whose indexes are Offset+I*K(I) to Offset+(I+1)*K(I)−1 among a set of the slots where the second CORESET is located are slots where a second CORESET corresponding to a first SSB with an index of I is located.

In the set of the slots where the second CORESET is located, a slot index is numbered from 0, and K(I) is the number of slots occupied by the second CORESET corresponding to the first SSB with an index of I.

Offset is an offset amount, where a value of the offset amount is configured by a service node or is a default value.

In item 15, according to the method of item 14, the method further includes: the slots where the second CORESET corresponding to the first SSB with an index of I is located are configured, and in the case where indexes of the configured slots exceed a slot index range of the set of the slots where the second CORESET is located, no second CORESET is configured for the first SSB with an index of I.

In item 16, according to the method of item 2, the number of slots occupied by a second CORESET corresponding to a first SSB with an index of I among second CORESETs is the same as the number of slots occupied by a first CORESET corresponding to the first SSB with the same index.

In item 17, according to the method of item 2, the method further includes indicating, through the first SSB, at least one of the following: whether the first SSB configures the second CORESET is indicated; the number of slots occupied by the second CORESET corresponding to the first SSB is indicated; or positions of the slots occupied by the second CORESET corresponding to the first SSB are indicated.

In item 18, according to the method of item 2, in the case where a gap between a frequency-domain resource position of the first SSB and a frequency domain position of the first CORESET is greater than a set value, a frequency domain position of the second CORESET is located between the frequency-domain resource position of the first SSB and the frequency domain position of the first CORESET.

In item 19, according to the method of item 18, the set value is determined by at least one of the following: being configured by a service node; being set as a default value; or being determined according to a subcarrier spacing of the second CORESET.

In item 20, according to the method of item 18, a subcarrier spacing of the second CORESET is the same as a subcarrier spacing of the first CORESET.

In item 21, according to the method of item 18, the frequency domain position of the second CORESET is adjacent to the frequency domain position of the first CORESET.

In item 22, according to the method of item 18, a size of the frequency-domain resource occupied by the second CORESET is a maximum value of a frequency-domain resource configurable for the second CORESET, where the maximum value satisfies a value less than or equal to the gap.

In item 23, according to the method of item 2, symbols corresponding to the second CORESET are located in slots where the first CORESET is located.

In item 24, according to the method of item 23, the symbols corresponding to the second CORESET are indicated by configuration information of the second CORESET in the first SSB.

The configuration information of the second CORESET is further used for indicating at least one of the following: whether to configure the second CORESET is indicated; start symbol index information of at least one second CORESET is indicated; or in the case where the number of slots where the first CORESET is located is greater than 1, slots where the second CORESET is located are indicated.

In item 25, according to the method of item 24, in the case where the number of symbols occupied by the first CORESET is 1, the index of the start symbol of the second CORESET is one of an index of the symbol occupied by the first CORESET increased by 1 or the index of the symbol occupied by the first CORESET increased by 2.

In item 26, according to the method of item 25, the second CORESET occupies one symbol.

In item 27, according to the method of item 24, the index of the start symbol of the second CORESET is as follows: a product of n and the number of symbols occupied by the second CORESET is subtracted from the number of symbols in the slots, and an offset value is subtracted, where a value of n is an integer greater than or equal to 1, and a value of the offset value is configured by a service node or is a default value.

In item 28, according to the method of item 27, the number of symbols occupied by the second CORESET is greater than or equal to 2.

In item 29, according to the method of any one of item 23, the second CORESET satisfies at least one of the following: the number of symbols occupied by the second CORESET is the same as the number of symbols occupied by the first CORESET; or a frequency-domain resource position occupied by the second CORESET is the same as a frequency-domain resource position occupied by the first CORESET.

In item 30, according to the method of item 6 or 10, the PDSCH is used for carrying RMSI.

In item 31, according to the method of item 2, the method further includes indicating, through the first SSB, a configuration scheme of the second CORESET.

The configuration scheme of the second CORESET includes at least one of the schemes described below.

An additional SSB corresponding to the target type terminal is configured within the period or the time duration, where the additional SSB and the second CORESET have an association relationship.

The second CORESET is configured by the first SSB.

Symbols corresponding to the second CORESET are located in slots where the first CORESET is located.

In item 32, according to the method of any one of items 1 to 10 or 31, the configuration scheme of the second CORESET includes a first scheme.

The first scheme includes: the target type terminal is configured with the corresponding additional SSB within the period or the time duration, where the additional SSB and the second CORESET have the association relationship.

In the case where the first scheme is used, any one of items 1 to 10 or 31 may be used.

In item 33, according to the method of any one of items 1, 2, 11 to 22 or 31, the configuration scheme of the second CORESET includes a second scheme.

The second scheme includes: the second CORESET is configured by the first SSB within the period or the time duration.

In the case where the second scheme is used, any one of items 1, 2 and 11 to 22 may be used.

In item 34, according to the method of any one of items 1, 2, 23 to 29 or 31, the configuration scheme of the second CORESET includes a third scheme.

The third scheme includes: the symbols corresponding to the second CORESET are located in the slots where the first CORESET is located.

In the case where the third scheme is used, any one of items 1, 2 and 23 to 29 may be used.

In item 35, a detection method includes: acquiring at least one CORESET corresponding to a target type terminal within one period or one time duration; and detecting a PDCCH in the at least one CORESET.

In item 36, according to the method of item 35, the CORESET includes at least one of a first CORESET corresponding to at least one first SSB within the period or the time duration or at least one second CORESET.

In item 37, according to the method of item 35, the target type terminal is configured with a corresponding additional SSB within the period or the time duration, where the additional SSB and a second CORESET have an association relationship.

In item 38, according to the method of item 36, in the case where the number of additional SSBs is less than the number of first SSBs, indexes of the additional SSBs are 0 to (N2−1), where N2 is the number of additional SSBs.

In item 39, according to the method of item 36, a time domain position of the second CORESET is that a set offset value is added based on a time domain position of the first CORESET corresponding to the first SSB.

In item 40, according to the method of item 36, for the target type terminal, the number of repetitions of a PDSCH is indicated by first DCI; alternatively, the number of repetitions of the PDSCH is indicated by second DCI; alternatively, the number of repetitions of the PDSCH is the same as the number of first CORESETs configured within the period or the time duration; alternatively, the number of repetitions of the PDSCH is the same as the number of second CORESETs configured within the period or the time duration; alternatively, the number of repetitions of the PDSCH is the same as a sum of the number of first CORESETs configured within the period or the time duration and the number of second CORESETs configured within the period or the time duration; alternatively, in the case where a corresponding additional SSB is configured for the target type terminal, the number of repetitions of the PDSCH is the same as the number of repetitions of the additional SSB within the period or the time duration;

alternatively, in the case of where the corresponding additional SSB is configured for the target type terminal, the number of repetitions of the PDSCH is the same as a sum of the number of repetitions of the first SSB within the period or the time duration and the number of repetitions of the additional SSB within the period or the time duration.

In item 41, according to the method of item 36, in the case where the CORESET corresponding to the target type terminal includes a first CORESET corresponding to at least one first SSB within the period or the time duration and at least one second CORESET, at least one of the following is satisfied: first DCI scheduling a non-target type terminal and second DCI scheduling the target type terminal carry the same information; or first MIB information in the first SSB is consistent with second MIB information in the additional SSB.

In item 42, according to the method of item 36, in the case where the CORESET corresponding to the target type terminal includes a first CORESET corresponding to at least one first SSB within the period or the time duration and at least one second CORESET, a PDCCH candidate satisfies at least one of the following: the PDCCH candidate is located in the first CORESET corresponding to the at least one first SSB; the PDCCH candidate is located in a PDCCH of the at least one second CORESET; or the PDCCH candidate is located in a set consisting of the first CORESET corresponding to the at least one first SSB and the at least one second CORESET.

In item 43, according to the method of item 42, the PDCCH candidate is located in the PDCCH of the at least one second CORESET.

In the case where the number P1 of the at least one second CORESET is greater than 1, a (j+1)-th PDCCH candidate is located in second CORESETs whose indexes are j*P1/J to (j+1)*P1/J−1 among the P1 second CORESETs, where a value of J is at least one of 2, 4, 6, 8, 16 or 24, and j is greater than or equal to 0 and less than or equal to (J−1).

In item 44, according to the method of item 42, the PDCCH candidate is located in the set consisting of the first CORESET corresponding to the at least one first SSB and the at least one second CORESET.

In the case where the number P2 of CORESETs in the set consisting of the first CORESET corresponding to the at least one first SSB and the at least one second CORESET is greater than 1, a (j+1)-th PDCCH candidate is located in CORESETs whose indexes are j*P2/J to (j+1)*P2/J−1 among the P2 CORESETs, where a value of J is at least one of 2, 4, 6, 8, 16 or 24, and j is greater than or equal to 0 and less than or equal to (J−1).

In item 45, according to the method of item 36, in the case where the CORESET corresponding to the target type terminal includes at least one second CORESET within the period or the time duration, the first SSB and the additional SSB satisfy at least one of the following: a sequence used by a synchronization signal in the first SSB is different from a sequence used by a synchronization signal in the additional SSB; a relative position between a PSS and an SSS in the first SSB is different from a relative position between a PSS and an SSS in the additional SSB; or a scrambling operation is performed on a PBCH in the additional SSB using a dedicated scrambling code of the target type terminal.

In item 46, according to the method of item 36, for the target type terminal, an index of a start slot of a PDSCH is an index of a last slot among slots where the second CORESET is located plus N, where N is an integer greater than or equal to 0, and a value of N is configured by a service node or is a default value.

In item 47, according to the method of item 36, the second CORESET satisfies at least one of the following: the second CORESET is configured by the first SSB; or a start slot of the second CORESET is determined according to a predetermined rule or indicated by the first SSB.

In item 48, according to the method of item 36, slots where the second CORESET is located include slots within the period or the time duration and do not include at least one of: a slot occupied by the first SSB; a slot occupied by the first SSB, where the first CORESET exists in the slot; or slots where the first CORESET is located.

In item 49, according to the method of item 36, slots where the second CORESET is located include slots within the period or the time duration, and an index of a start slot is an index of a last slot among slots where the first CORESET is located plus G1, where G1 is greater than or equal to 0.

In item 50, according to the method of item 48 or 49, slots whose indexes are Offset+I*K(I) to Offset+(I+1)*K(I)−1 among a set of the slots where the second CORESET is located are slots where a second CORESET corresponding to a first SSB with an index of I is located.

In the set of the slots where the second CORESET is located, a slot index is numbered from 0, and K(I) is the number of slots occupied by the second CORESET corresponding to the first SSB with an index of I.

Offset is an offset amount, where a value of the offset amount is configured by a service node or is a default value.

In item 51, according to the method of item 50, in the case where indexes of the slots configured for the second CORESET corresponding to the first SSB with an index of I exceed a slot index range of the set of the slots where the second CORESET is located, no second CORESET is configured for the first SSB with an index of I.

In item 52, according to the method of item 36, the number of slots occupied by a second CORESET corresponding to a first SSB with an index of I among second CORESETs is the same as the number of slots occupied by a first CORESET corresponding to the first SSB with the same index.

In item 53, according to the method of item 36, the first SSB indicates at least one of the following: whether the first SSB configures the second CORESET is indicated; the number of slots occupied by the second CORESET corresponding to the first SSB is indicated; or positions of the slots occupied by the second CORESET corresponding to the first SSB are indicated.

In item 54, according to the method of item 36, in the case where a gap between a frequency-domain resource position of the first SSB and a frequency domain position of the first CORESET is greater than a set value, a frequency domain position of the second CORESET is located between the frequency-domain resource position of the first SSB and the frequency domain position of the first CORESET.

In item 55, according to the method of item 54, the set value is determined by at least one of the following: being configured by a service node; being set as a default value; or being determined according to a subcarrier spacing of the second CORESET.

In item 56, according to the method of item 54, a subcarrier spacing of the second CORESET is the same as a subcarrier spacing of the first CORESET.

In item 57, according to the method of item 54, the frequency domain position of the second CORESET is adjacent to the frequency domain position of the first CORESET.

In item 58, according to the method of item 54, a size of the frequency-domain resource occupied by the second CORESET is a maximum value of a frequency-domain resource configurable for the second CORESET, where the maximum value satisfies a value less than or equal to the gap.

In item 59, according to the method of item 36, symbols corresponding to the second CORESET are located in slots where the first CORESET is located.

In item 60, according to the method of item 36, symbols corresponding to the second CORESET are indicated by configuration information of the second CORESET in the first SSB.

The configuration information of the second CORESET is further used for indicating at least one of the following: whether to configure the second CORESET is indicated; start symbol index information of at least one second CORESET is indicated; or when the number of slots where the first CORESET is located is greater than 1, slots where the second CORESET is located are indicated.

In item 61, according to the method of item 60, in the case where the number of symbols occupied by the first CORESET is 1, the index of the start symbol of the second CORESET is one of an index of the symbol occupied by the first CORESET increased by 1 or the index of the symbol occupied by the first CORESET increased by 2.

In item 62, according to the method of item 61, the second CORESET occupies one symbol.

In item 63, according to the method of item 60, the index of the start symbol of the second CORESET is as follows: a product of n and the number of symbols occupied by the second CORESET is subtracted from the number of symbols in the slots, and an offset value is subtracted, where a value of n is an integer greater than or equal to 1, and a value of the offset value is configured by a service node or is a default value.

In item 64, according to the method of item 60, the number of symbols occupied by the second CORESET is greater than or equal to 2.

In item 65, according to the method of item 59, the second CORESET satisfies at least one of the following: the number of symbols occupied by the second CORESET is the same as the number of symbols occupied by the first CORESET; or a frequency-domain resource position occupied by the second CORESET is the same as a frequency-domain resource position occupied by the first CORESET.

In item 66, according to the method of item 40 or 46, the PDSCH is used for carrying RMSI.

In item 67, according to the method of item 36, the first SSB is used for indicating a configuration scheme of the second CORESET.

The configuration scheme of the second CORESET includes at least one of the schemes described below.

An additional SSB corresponding to the target type terminal is configured within the period or the time duration, where the additional SSB and the second CORESET have an association relationship.

The second CORESET is configured by the first SSB.

Symbols corresponding to the second CORESET are located in slots where the first CORESET is located.

In item 68, according to the method of any one of items 35 to 46 or 67, the configuration scheme of the second CORESET includes a first scheme.

The first scheme includes: the target type terminal is configured with the corresponding additional SSB within the period or the time duration, where the additional SSB and the second CORESET have the association relationship.

In the case where the first scheme is used, any one of items 35 to 46 or 67 may be used.

In item 69, according to the method of any one of items 35, 36, 47 to 58 and 67, the configuration scheme of the second CORESET includes a second scheme.

The second scheme includes: the second CORESET is configured by the first SSB within the period or the time duration.

In the case where the second scheme is used, any one of items 35, 36, 47 to 58 and 67 may be used.

In item 70, according to the method of any one of items 35, 36 and 59 to 67, the configuration scheme of the second CORESET includes a third scheme.

The third scheme includes: the symbols corresponding to the second CORESET are located in the slots where the first CORESET is located.

In the case where the third scheme is used, any one of items 35, 36 and 59 to 67 may be used.

In item 71, a service node includes one or more processors and a storage apparatus which is configured to store one or more programs.

The one or more programs, when executed by the one or more processors, cause the one or more processors to implement the resource set configuration method according to any one of items 1 to 34.

In item 72, a terminal includes one or more processors and a storage apparatus which is configured to store one or more programs.

The one or more programs, when executed by the one or more processors, cause the one or more processors to implement the detection method according to any one of items 35 to 70.

In item 73, a computer-readable storage medium stores a computer program, where the program, when executed by a processor, implements the resource set configuration method according to any one of items 1 to 34 or the detection method according to any one of items 35 to 70.

The detailed description of example embodiments of the present application has been provided above through exemplary and non-restrictive examples. However, considering the drawings and the claims, various modifications and adjustments to the preceding embodiments are apparent to those skilled in the art without deviating from the scope of the present disclosure. Accordingly, the proper scope of the present disclosure is determined according to the claims.

What is claimed is:

1. A resource set configuration method, comprising:
configuring at least one control resource set (CORESET) corresponding to a target type terminal within one period or one time duration; and
sending a physical downlink control channel (PDCCH) in the at least one CORESET,
wherein the CORESET comprises at least one of:
a first CORESET corresponding to at least one first synchronization signal block/physical broadcast channel block (SSB) within the period or the time duration; or
at least one second CORESET,
wherein the method further comprises:
configuring an additional SSB corresponding to the target type terminal within the period or the time duration;
wherein the additional SSB and the second CORESET have an association relationship,
wherein in a case where a corresponding additional SSB is configured for the target type terminal, first master information block (MIB) information in the first SSB is the same as second MIB information in the additional SSB.

2. The method according to claim 1, wherein for the target type terminal, a number of repetitions of a physical downlink shared channel (PDSCH) satisfies one of the following:
   the number of repetitions of the PDSCH is indicated by first downlink control information (DCI);
   the number of repetitions of the PDSCH is indicated by second DCI;
   the number of repetitions of the PDSCH is the same as a number of first CORESETs configured within the period or the time duration;
   the number of repetitions of the PDSCH is the same as a number of second CORESETs configured within the period or the time duration;
   the number of repetitions of the PDSCH is the same as a sum of a number of first CORESETs configured within the period or the time duration and a number of second CORESETs configured within the period or the time duration;
   in a case where a corresponding additional SSB is configured for the target type terminal, the number of repetitions of the PDSCH is the same as a number of repetitions of the additional SSB within the period or the time duration; or,
   in a case where a corresponding additional SSB is configured for the target type terminal, the number of repetitions of the PDSCH is the same as a sum of a number of repetitions of the first SSB within the period or the time duration and a number of repetitions of the additional SSB within the period or the time duration,
   wherein the PDSCH is used for carrying remaining minimum system information (RMSI).

3. The method according to claim 1, wherein first DCI scheduling a non-target type terminal and second DCI scheduling the target type terminal carry same information.

4. The method according to claim 1, wherein in a case where a corresponding additional SSB is configured for the target type terminal, the first SSB and the additional SSB satisfy at least one of the following:
   a sequence used by a synchronization signal in the first SSB is different from a sequence used by a synchronization signal in the additional SSB;
   a relative position between a primary synchronization signal (PSS) and a secondary synchronization signal (SSS) in the first SSB is different from a relative position between a PSS and an SSS in the additional SSB; or
   a scrambling operation is performed on a PBCH in the additional SSB using a dedicated scrambling code of the target type terminal.

5. The method according to claim 1, wherein for the target type terminal, an index of a start slot of a PDSCH is an index of a last slot among slots where the second CORESET is located plus N, wherein N is an integer greater than or equal to 0;
   wherein a value of N is configured by a service node or is a default value,
   wherein the PDSCH is used for carrying remaining minimum system information (RMSI).

6. The method according to claim 1, wherein the second CORESET is configured by the first SSB; and
   a start slot of the second CORESET is determined according to a predetermined rule or indicated by the first SSB.

7. The method according to claim 1, wherein slots where the second CORESET is located comprise slots within the period or the time duration except at least one of:
   a slot occupied by the first SSB;
   a slot occupied by the first SSB, wherein the first CORESET exists in the slot; or,
   slots where the first CORESET is located,
   or slots where the second CORESET is located comprise slots within the period or the time duration, and an index of a start slot is an index of a last slot among slots where the first CORESET is located plus G1, wherein G1 is greater than or equal to 0,
   wherein slots whose index are Offset+I*K(I) to Offset+(I+1)*K(I)−1 among a set of the slots where the second CORESET is located are slots where a second CORESET corresponding to a first SSB with an index of I is located; to Offset + (I+1) * K (I)-1
   in the set of the slots where the second CORESET is located, a slot index is numbered from 0, and K(I) is a number of slots occupied by the second CORESET corresponding to the first SSB with an index of I; and
   Offset is an offset amount, wherein a value of the offset amount is configured by a service node or is a default value.

8. The method according to claim 1, further comprising indicating, through the first SSB, at least one of the following:
   whether the first SSB configures the second CORESET;
   a number of slots occupied by the second CORESET corresponding to the first SSB; or
   positions of slots occupied by the second CORESET corresponding to the first SSB.

9. The method according to claim 1, wherein in a case where a gap between a frequency-domain resource position of the first SSB and a frequency domain position of the first CORESET is greater than a set value, a frequency domain position of the second CORESET is located between the frequency-domain resource position of the first SSB and the frequency domain position of the first CORESET,
   wherein the set value is determined by at least one of the following:
   being configured by a service node;
   being set as a default value; or
   being determined according to a subcarrier spacing of the second CORESET,
   wherein a subcarrier spacing of the second CORESET is the same as a subcarrier spacing of the first CORESET,
   wherein the frequency domain position of the second CORESET is adjacent to the frequency domain position of the first CORESET,
   wherein a size of the frequency-domain resource occupied by the second CORESET is a maximum value of a frequency-domain resource configurable for the second CORESET,
   wherein the maximum value satisfies a value less than or equal to the gap between the frequency-domain resource position of the first SSB and the frequency domain position of the first CORESET.

10. The method according to claim 1, wherein symbols corresponding to the second CORESET are located in slots where the first CORESET is located,
    wherein the symbols corresponding to the second CORESET are indicated by configuration information of the second COREST in the first SSB;
    wherein the configuration information of the second CORESET is further used for indicating at least one of the following:

whether to configure the second CORESET;

start symbol index information of at least one second CORESET; or in a case where a number of the slots where the first CORESET is located is greater than 1, indicating slots where the second CORESET is located, wherein an index of a start symbol of the second CORESET is as follows:

subtracting a product of n and a number of symbols occupied by the second CORESET from a number of symbols in the slots and subtracting an offset value, wherein n is an integer greater than or equal to 1;

wherein a value of the offset value is configured by a service node or set as a default value, wherein the number of symbols occupied by the second CORESET is greater than or equal to 2.

11. The method according to claim 10, wherein the second CORESET satisfies at least one of the following:

a number of symbols occupied by the second CORESET is the same as a number of symbols occupied by the first CORESET; or a frequency-domain resource position occupied by the second CORESET is the same as a frequency-domain resource position occupied by the first CORESET.

12. A detection method, comprising:

acquiring at least one control resource set (CORESET) corresponding to a target type terminal within one period or one time duration; and detecting a physical downlink control channel (PDCCH) in the at least one CORESET, wherein the CORESET comprises at least one of:

a first CORESET corresponding to at least one first synchronization signal block (SSB)/physical broadcast channel (PBCH) block within the period or the time duration; or at least one second CORESET, wherein in a case where the CORESET comprises a first CORESET corresponding to at least one first synchronization signal block, SSB, and at least one second CORESET, first master information block, MIB, information in the first SSB is the same as second MIB information in an additional SSB, and the additional SSB and the second CORESET have an association relationship.

13. The method according to claim 12, wherein in a case where the CORESET corresponding to the target type terminal comprises a first CORESET corresponding to at least one first SSB within the period or the time duration and at least one second CORESET, a PDCCH candidate satisfies at least one of the following:

the PDCCH candidate is located in a CORESET corresponding to the at least one first SSB;

the PDCCH candidate is located in a PDCCH of the at least one second CORESET; or the PDCCH candidate is located in a set consisting of the first CORESET corresponding to the at least one first SSB and the at least one second CORESET.

14. The method according to claim 12, wherein in a case where the CORESET corresponding to the target type terminal comprises a first CORESET corresponding to at least one first SSB within the period or the time duration and at least one second CORESET, a PDCCH candidate is located in a PDCCH of the at least one second CORESET;

in a case where a number P1 of the at least one second CORESET is greater than 1, a (j+1)-th PDCCH candidate is located in second CORESETs whose indexes are j*P1/J to (j+1)*P1/J−1 among the P1 second CORESETs;

wherein a value of J is at least one of 2, 4, 6, 8, 16 or 24; and wherein j is greater than or equal to 0 and less than or equal to (J−1).

15. The method according to claim 12, wherein in a case where the CORESET corresponding to the target type terminal comprises a first CORESET corresponding to at least one first SSB within the period or the time duration and at least one second CORESET, a PDCCH candidate is located in a set consisting of the first CORESET corresponding to the at least one SSB and the at least one second CORESET;

in a case where a number P2 of CORESETs in the set consisting of the first CORESET corresponding to the at least one SSB and the at least one second CORESET is greater than 1, a (j+1)-th PDCCH candidate is located in CORESETs whose indexes are j*P2/J to (j+1)*P2/J−1 among the P2 CORESETs;

wherein a value of J is at least one of 2, 4, 6, 8, 16 or 24; and wherein j is greater than or equal to 0 and less than or equal to (J−1).

16. A service node, comprising:

one or more processors; and a storage apparatus, which is configured to store one or more programs;

wherein the one or more processors execute the one or more programs to implement the resource set configuration method according to claim 1.

17. A terminal, comprising:

one or more processors; and a storage apparatus, which is configured to store one or more programs;

wherein the one or more processors execute the one or more programs to implement to implement the detection method according to claim 12.

18. A non-transitory computer-readable storage medium storing a computer program, wherein the computer program, when executed by a processor, implements the resource set configuration method according claim 1.

* * * * *